United States Patent
Chen et al.

(10) Patent No.: US 11,647,215 B2
(45) Date of Patent: May 9, 2023

(54) METHOD AND APPARATUS FOR SIGNALING VIDEO CODING INFORMATION

(71) Applicant: ALIBABA GROUP HOLDING LIMITED, Grand Cayman (KY)

(72) Inventors: Jie Chen, Beijing (CN); Ru-Ling Liao, Beijing (CN); Jiancong Luo, San Mateo, CA (US); Yan Ye, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/998,446

(22) Filed: Aug. 20, 2020

(65) Prior Publication Data
US 2021/0084322 A1    Mar. 18, 2021

Related U.S. Application Data

(60) Provisional application No. 62/899,169, filed on Sep. 12, 2019.

(51) Int. Cl.
| | |
|---|---|
| H04N 19/46 | (2014.01) |
| H04N 19/157 | (2014.01) |
| H04N 19/174 | (2014.01) |
| H04N 19/184 | (2014.01) |
| H04L 65/75 | (2022.01) |

(52) U.S. Cl.
CPC ............. *H04N 19/46* (2014.11); *H04L 65/75* (2022.05); *H04N 19/157* (2014.11); *H04N 19/174* (2014.11); *H04N 19/184* (2014.11)

(58) Field of Classification Search
CPC ....... H04N 19/46; H04N 19/172; H04N 19/70
See application file for complete search history.

(56) References Cited

U.S. PATENT DOCUMENTS

| | | |
|---|---|---|
| 8,290,038 B1 | 10/2012 | Wang et al. |
| 2012/0207227 A1 | 8/2012 | Tsai et al. |
| 2013/0077696 A1* | 3/2013 | Zhou ............... H04N 19/172 375/E7.026 |

(Continued)

FOREIGN PATENT DOCUMENTS

| | | | |
|---|---|---|---|
| WO | WO 2019/089933 A1 | 5/2019 | |
| WO | WO-2019238008 A1 * | 12/2019 | ......... H04N 19/105 |

(Continued)

OTHER PUBLICATIONS

Bross et al., "Versatile Video Coding (Draft 4)," JVET-M1001-v7, 13$^{th}$ Meeting: Marakech, MA, Jan. 9-18, 2019, 300 pages.

(Continued)

*Primary Examiner* — Fabio S Lima
(74) *Attorney, Agent, or Firm* — Finnegan, Henderson, Farabow, Garrett & Dunner, LLP

(57) ABSTRACT

The present disclosure provides methods and apparatuses for controlling a coding mode for video data. The methods and apparatuses include receiving a bitstream of video data; enabling or disabling a coding mode for a video sequence, based on a first flag in the bitstream; and determining whether controlling of the coding mode is enabled or disabled at a level lower than a sequence level, based on a second flag in the bitstream.

23 Claims, 25 Drawing Sheets

(56) References Cited

U.S. PATENT DOCUMENTS

| | | | |
|---|---|---|---|
| 2014/0003492 A1 | 1/2014 | Chen et al. | |
| 2016/0234494 A1 | 8/2016 | Seregin et al. | |
| 2016/0330481 A1 | 11/2016 | Zhang et al. | |
| 2019/0238883 A1 | 8/2019 | Chen et al. | |
| 2020/0304805 A1* | 9/2020 | Li | H04N 19/14 |
| 2020/0366888 A1* | 11/2020 | Seregin | H04N 19/426 |
| 2021/0044833 A1* | 2/2021 | Yang | H04N 19/174 |
| 2021/0058634 A1* | 2/2021 | Li | H04N 19/186 |
| 2021/0368198 A1* | 11/2021 | Zhang | H04N 19/132 |
| 2022/0182659 A1* | 6/2022 | Xiu | H04N 19/176 |
| 2022/0210431 A1* | 6/2022 | Xiu | H04N 19/137 |
| 2022/0210462 A1* | 6/2022 | Luo | H04N 19/105 |

FOREIGN PATENT DOCUMENTS

| | | | |
|---|---|---|---|
| WO | WO2020211867 A1 | 10/2020 | |
| WO | WO-2020253858 A1 * | 12/2020 | H04N 19/136 |
| WO | WO2021023255 A1 | 2/2021 | |
| WO | WO2021041332 A1 | 3/2021 | |

OTHER PUBLICATIONS

Bross et al., "Versatile Video Coding (Draft 6), "JVET-O2001-vE, 15$^{th}$ Meeting: Gothenburg, SE, Jul. 3-12, 2019, 455 pages.

Chen et al., "Algorithm description for Versatile Vide Coding and Test Model 6 (VTM 6)," JVET-O2002-v2, 15$^{th}$ Meeting: Gothenburg, SE, 87 pages (2019).

Chen et al., "Algorithm Description of Joint Exploration Test Model 7 (JEM 7)," JVET-G1001-v1, 7$^{th}$ Meeting: Torino, IT, Jul. 13-21, 2017, 50 pages.

PCT International Search Report and Written Opinion dated Dec. 21, 2020, issued in corresponding International Application No. PCT/US2020/047139 (11 pgs.).

Sullivan et al., "Overview of the High Efficiency Video Coding (HEVC) Standard," IEE Transactions on Circuits and Systems for Video Technology, vol. 22, No. 12, pp. 1649-1668 (2012).

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Segall et al., "Joint Call for Proposals on Video Compression with Capability beyond Hevc," JVET-H1002 (v6), 8$^{th}$ Meeting: Macao, CN, Oct. 18-24, 2017, 27 pages.

Schafer et al., "Digital Video Coding Standards and Their Role in Video Communications," Proceedings of the IEEE, vol. 83, No. 6, pp. 907-924 (1995).

Bross et al., "Versatile Video Coding (Draft 4)," JVET-N1001-v10, 13$^{th}$ Meeting: Marakech, MA, Jan. 9-18, 2019, 300 pages.

PCT International Search Report and Written Opinion dated Nov. 9, 2020, issued in corresponding International Application No. PCT/US2020/047113 (6 pgs.).

European Patent Office Communication issued for Application No. 20862999.8 which encloses the extended European Search Report which includes pursuant to Rule 62 EPC, the Supplementary European Search Report (Art. 153(7) EPC) and the European search opinion, dated Oct. 11, 2022, 18 pages.

Chen et al., "CE4-related: On PROF on/off control," JVET-P0408, 16$^{th}$ Meeting: Geneva, CH, Oct. 1-11, 2019, 4 pages.

He et al., "Unified syntax for JVET-O0184/O0250/O0504 on DMVR and BDOF flag," JVET-O1140-v1, 15$^{th}$ Meeting: Gothenburg, SE, Jul. 3-12, 2019, 2 pages.

Xiu et al., "Non-CE4/AHG17: On high-level control flags of BDOF and PROF," JVET-P0524_rl, 16$^{th}$ Meeting: Geneva, CH, Oct. 1-11, 2019, 6 pages.

* cited by examiner

700
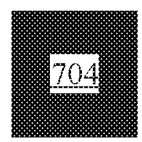
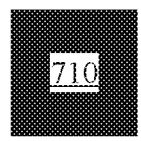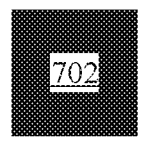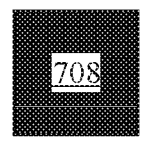
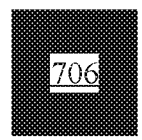
FIG. 7

Table 1: control flags for DMVR and BDOF in SPS

| seq_parameter_set_rbsp( ) { | Descriptor |
|---|---|
| ... | |
|   sps_bdof_enabled_flag | u(1) |
|   sps_smvd_enabled_flag | u(1) |
|   sps_dmvr_enabled_flag | u(1) |
|   if( sps_bdof_enabled_flag \|\| sps_dmvr_enabled_flag) | |
|     sps_bdof_dmvr_slice_present_flag | u(1) |
| ... | |
|   if( sps_affine_enabled_flag ) { | |
|     sps_affine_type_flag | u(1) |
|     sps_affine_amvr_enabled_flag | u(1) |
|     sps_affine_prof_enabled_flag | u(1) |
|   } | |
| ... | |

FIG. 12

Table 2: control flags for BDOF and DMVR in slice header

| slice_header( ) { | Descriptor |
|---|---|
| ... | |
|   if( sps_bdof_dmvr_slice_present_flag ) | |
|     slice_disable_bdof_dmvr_flag | u(1) |
| ... | |

FIG. 13

Table 3A: slice-level control flags for DMVR, BDOF, and PROF in SPS

| seq_parameter_set_rbsp( ) { | Descriptor |
|---|---|
| ... | |
| sps_bdof_enabled_flag | u(1) |
| *if( sps_bdof_enabled_flag)* | |
| *sps_bdof_slice_present_flag* | *u(1)* |
| sps_dmvr_enabled_flag | u(1) |
| *if( sps_dmvr_enabled_flag)* | |
| *sps_ dmvr_slice_present_flag* | *u(1)* |
| if( sps_affine_enabled_flag ) { | |
| ... | u(1) |
| sps_affine_prof_enabled_flag | u(1) |
| *if( sps_affine_prof_enabled_flag)* | |
| *sps_ affine_prof_slice_present_flag* | *u(1)* |
| } | |
| ... | |

FIG. 14A

Table 3B: picture-level control flags for DMVR, BDOF, and PROF in SPS

| seq_parameter_set_rbsp( ) { | Descriptor |
|---|---|
| ... | |
| sps_bdof_enabled_flag | u(1) |
| *if( sps_bdof_enabled_flag )* | |
| *sps_bdof_picture_present_flag* | *u(1)* |
| sps_dmvr_enabled_flag | u(1) |
| *if( sps_dmvr_enabled_flag )* | |
| *sps_dmvr_picture_present_flag* | *u(1)* |
| if( sps_affine_enabled_flag ) { | |
| ... | u(1) |
| sps_affine_prof_enabled_flag | u(1) |
| } | |
| *if( sps_affine_prof_enabled_flag)* | |
| *sps_affine_prof_picture_present_flag* | *u(1)* |
| ... | |

FIG. 14B

Table 4A: control flags for DMVR, BDOF, and PROF in slice header

| slice_header( ) { | Descriptor |
|---|---|
| ... | |
| if( sps_bdof_slice_present_flag ) | |
|     slice_disable_bdof_flag | u(1) |
| if( sps_dmvr_slice_present_flag ) | |
|     slice_disable_dmvr_flag | u(1) |
| if(sps_affine_prof_slice_present_flag ) | |
|     slice_disable_affine_prof_flag | u(1) |
| ... | |

FIG. 15A

Table 4B: control flags for DMVR, BDOF, and PROF in picture header

| picture_header( ) { | Descriptor |
|---|---|
| ... | |
| if( sps_bdof_picture_present_flag ) | |
|     ph_disable_bdof_flag | u(1) |
| if( sps_dmvr_picture_present_flag ) | |
|     ph_disable_dmvr_flag | u(1) |
| if(sps_affine_prof_picture_present_flag ) | |
|     ph_disable_affine_prof_flag | u(1) |
| ... | |

FIG. 15B

Table 5: separate sequence-level control flags for DMVR, BDOF, and PROF in SPS

| seq_parameter_set_rbsp( ) { | Descriptor |
|---|---|
| ... | |
| sps_bdof_enabled_flag | u(1) |
| sps_dmvr_enabled_flag | u(1) |
| if( sps_affine_enabled_flag ) { | |
| ... | |
| sps_affine_prof_enabled_flag | u(1) |
| } | |
| if( sps_bdof_enabled_flag \|\| sps_dmvr_enabled_flag \|\| sps_affine_prof_enabled_flag) | |
| sps_bdof_dmvr_affine_prof_slice_present_flag | u(1) |
| ... | |

FIG. 16

Table 6: joint slice-level control flag for DMVR, BDOF, and PROF in slice header

| slice_header( ) { | Descriptor |
|---|---|
| ... | |
| if(sps_bdof_dmvr_affine_prof_slice_present_flag) | |
| slice_disable_bdof_dmvr_affine_prof_flag | u(1) |
| ... | |

FIG. 17

Table 7: separate slice-level control flags for DMVR, BDOF, and PROF in slice header

| slice_header( ) { | Descriptor |
|---|---|
| ... | |
| *if(sps_bdof_dmvr_affine_prof_slice_present_flag && sps_bdof_enabled_flag)* | |
| slice_disable_bdof_flag | *u(1)* |
| *if(sps_bdof_dmvr_affine_prof_slice_present_flag && sps_dmvr_enabled_flag)* | |
| slice_disable_dmvr_flag | *u(1)* |
| *if(sps_bdof_dmvr_affine_prof_slice_present_flag && sps_affine_prof_enabled_flag)* | |
| slice_disable_affine_prof_flag | *u(1)* |
| ... | |

FIG. 18

Table 8: hybrid slice-level control flags for DMVR, BDOF, and PROF in slice header

| slice_header( ) { | Descriptor |
|---|---|
| ... | |
| *if(sps_bdof_dmvr_affine_prof_slice_present_flag && (sps_bdof_enabled_flag\|\| sps_affine_prof_enabled_flag))* | |
| slice_disable_bdof_affine_prof_flag | *u(1)* |
| *if(sps_bdof_dmvr_affine_prof_slice_present_flag && sps_dmvr_enabled_flag)* | |
| slice_disable_dmvr_flag | *u(1)* |
| ... | |

FIG. 19

Table 9: hybrid sequence-level control flags for DMVR, BDOF, and PROF in SPS

| seq_parameter_set_rbsp( ) { | Descriptor |
|---|---|
| ... | |
| sps_bdof_enabled_flag | u(1) |
| sps_dmvr_enabled_flag | u(1) |
| if( sps_affine_enabled_flag ) { | |
| ... | u(1) |
| sps_affine_prof_enabled_flag | u(1) |
| } | |
| *if( sps_bdof_enabled_flag || sps_affine_prof_enabled_flag)* | |
| sps_bdof_affine_prof_slice_present_flag | *u(1)* |
| *if( sps_dmvr_enabled_flag)* | |
| sps_dmvr_slice_present_flag | *u(1)* |
| | |
| ... | |

FIG. 20

Table 10: hybrid slice-level control flags for DMVR, BDOF, and PROF in slice header

| slice_header( ) { | Descriptor |
|---|---|
| ... | |
| *if(sps_bdof_affine_prof_slice_present_flag)* | |
| slice_disable_bdof_affine_prof_flag | *u(1)* |
| *if(sps_dmvr_slice_present_flag)* | |
| slice_disable_dmvr_flag | *u(1)* |
| ... | |

FIG. 21

Table 11: separate slice-level control flags for DMVR, BDOF, and PROF in slice header

| slice_header( ) { | Descriptor |
|---|---|
| ... | |
| if(sps_bdof_affine_prof_slice_present_flag && sps_bdof_enabled_flag) | |
|     *slice_disable_bdof_flag* | u(1) |
| if(sps_bdof_affine_prof_slice_present_flag && sps_affine_prof_enabled_flag) | |
|     *slice_disable_affine_prof_flag* | u(1) |
| if(sps_dmvr_slice_present_flag) | |
|     *slice_disable_dmvr_flag* | u(1) |
| ... | |

FIG. 22

METHOD AND APPARATUS FOR SIGNALING VIDEO CODING INFORMATION

CROSS-REFERENCE TO RELATED APPLICATIONS

The present disclosure claims priority to U.S. provisional application No. 62/899,169, filed on Sep. 12, 2019, which is incorporated herein by reference in its entirety.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of present disclosure provide a method and apparatus for controlling a coding mode for video data. In an example embodiment, a method includes: receiving a bitstream of video data; enabling or disabling a coding mode for a video sequence, based on a first flag in the bitstream; and determining controlling of whether the coding mode is enabled or disabled at a level lower than a sequence level, based on a second flag in the bitstream.

In another example embodiment, a method includes: receiving a bitstream of video data; enabling or disabling a first coding mode for a video sequence, based on a first flag in the bitstream; enabling or disabling a second coding mode for the video sequence, based on a second flag in the bitstream; and determining whether controlling of at least one of the first coding mode or the second coding mode is enabled at level lower than a sequence level, based on a third flag in the bitstream.

In another example embodiment, a method includes: receiving a video sequence, a first flag, and a second flag; enabling or disabling a coding mode for a video bitstream, based on the first flag; and enabling or disabling controlling of the coding mode at a level lower than a sequence level, based on the second flag.

In another example embodiment, a method includes: receiving a video sequence, a first flag, a second flag, and a third flag; enabling or disabling a first coding mode for a video bitstream, based on the first flag; enabling or disabling a second coding mode for the video bitstream, based on the second flag; and enabling or disabling controlling of at least one of the first coding mode or the second coding mode at a level lower than a sequence level, based on the third flag.

In another example embodiment, a non-transitory computer-readable medium stores a set of instructions that is executable by at least one processor of an apparatus to cause the apparatus to perform a method. The method includes: receiving a bitstream of video data; enabling or disabling a coding mode for a video sequence, based on a first flag in the bitstream; and determining whether controlling of the coding mode is enabled or disabled at a level lower than a sequence level, based on a second flag in the bitstream.

In another example embodiment, a non-transitory computer-readable medium stores a set of instructions that is executable by at least one processor of an apparatus to cause the apparatus to perform a method. The method includes: receiving a bitstream of video data; enabling or disabling a first coding mode for a video sequence, based on a first flag in the bitstream; enabling or disabling a second coding mode for the video sequence, based on a second flag in the bitstream; and determining whether controlling of at least one of the first coding mode or the second coding mode is enabled at a level lower than a sequence level, based on a third flag in the bitstream.

In another embodiment, an apparatus includes a memory configured to store a set of instructions and one or more processors communicatively coupled to the memory. The one or more processors are configured to execute the set of instructions to cause the apparatus to: receive a bitstream of video data; enable or disable a coding mode for a video sequence, based on a first flag in the bitstream; and determine whether controlling of the coding mode is enabled or disabled at a level lower than a sequence level, based on a second flag in the bitstream.

In another embodiment, an apparatus includes a memory configured to store a set of instructions and one or more processors communicatively coupled to the memory. The one or more processors are configured to execute the set of instructions to cause the apparatus to: receive a bitstream of video data; enable or disable a first coding mode for a video sequence, based on a first flag in the bitstream; enable or disable a second coding mode for the video sequence, based on a second flag in the bitstream; and determine whether controlling of at least one of the first coding mode or the second coding mode is enabled at a level lower than a sequence level, based on a third flag in the bitstream.

BRIEF DESCRIPTION OF THE DRAWINGS

Embodiments and various aspects of present disclosure are illustrated in the following detailed description and the accompanying figures. Various features shown in the figures are not drawn to scale.

FIG. 7 is a schematic diagram illustrating an example pattern for DMVR integer luma sample searching, according to some embodiments of the present disclosure.

FIG. 12 illustrates Table 1 showing an example syntax structure of a Sequence Parameter Set (SPS) implementing control flags for DMVR and BDOF, according to some embodiments of the present disclosure.

FIG. 13 illustrates Table 2 showing an example syntax structure of a slice header implementing control flags for DMVR and BDOF, according to some embodiments of the present disclosure.

FIG. 14A illustrates Table 3A showing an example syntax structure of an SPS implementing slice-level control flags for DMVR, BDOF, and prediction refinement with optical flow (PROF), according to some embodiments of the present disclosure.

FIG. 14B illustrates Table 3B showing an example syntax structure of an SPS implementing picture-level control flags for DMVR, BDOF, and PROF, according to some embodiments of the present disclosure.

FIG. 15A illustrates Table 4A showing an example syntax structure of a slice header implementing control flags for DMVR, BDOF, and PROF, according to some embodiments of the present disclosure.

FIG. 15B illustrates Table 4B showing an example syntax structure of a picture header implementing control flags for DMVR, BDOF, and PROF, according to some embodiments of the present disclosure.

FIG. 16 illustrates Table 5 showing an example syntax structure of an SPS implementing separate sequence-level control flags for DMVR, BDOF, and PROF, according to some embodiments of the present disclosure.

FIG. 17 illustrates Table 6 showing an example syntax structure of a slice header implementing a joint control flag for DMVR, BDOF, and PROF, according to some embodiments of the present disclosure.

FIG. 18 illustrates Table 7 showing an example syntax structure of a slice header implementing separate control flags for DMVR, BDOF, and PROF, according to some embodiments of the present disclosure.

FIG. 19 illustrates Table 8 showing an example syntax structure of a slice header implementing hybrid control flags for DMVR, BDOF, and PROF, according to some embodiments of the present disclosure.

FIG. 20 illustrates Table 9 showing an example syntax structure of an SPS implementing hybrid sequence-level control flags for DMVR, BDOF, and PROF, according to some embodiments of the present disclosure.

FIG. 21 illustrates Table 10 showing another example syntax structure of a slice header implementing hybrid control flags for DMVR, BDOF, and PROF, according to some embodiments of the present disclosure.

FIG. 22 illustrates Table 11 showing another example syntax structure of a slice header implementing separate control flags for DMVR, BDOF, and PROF, according to some embodiments of the present disclosure.

DETAILED DESCRIPTION

Figure 1:
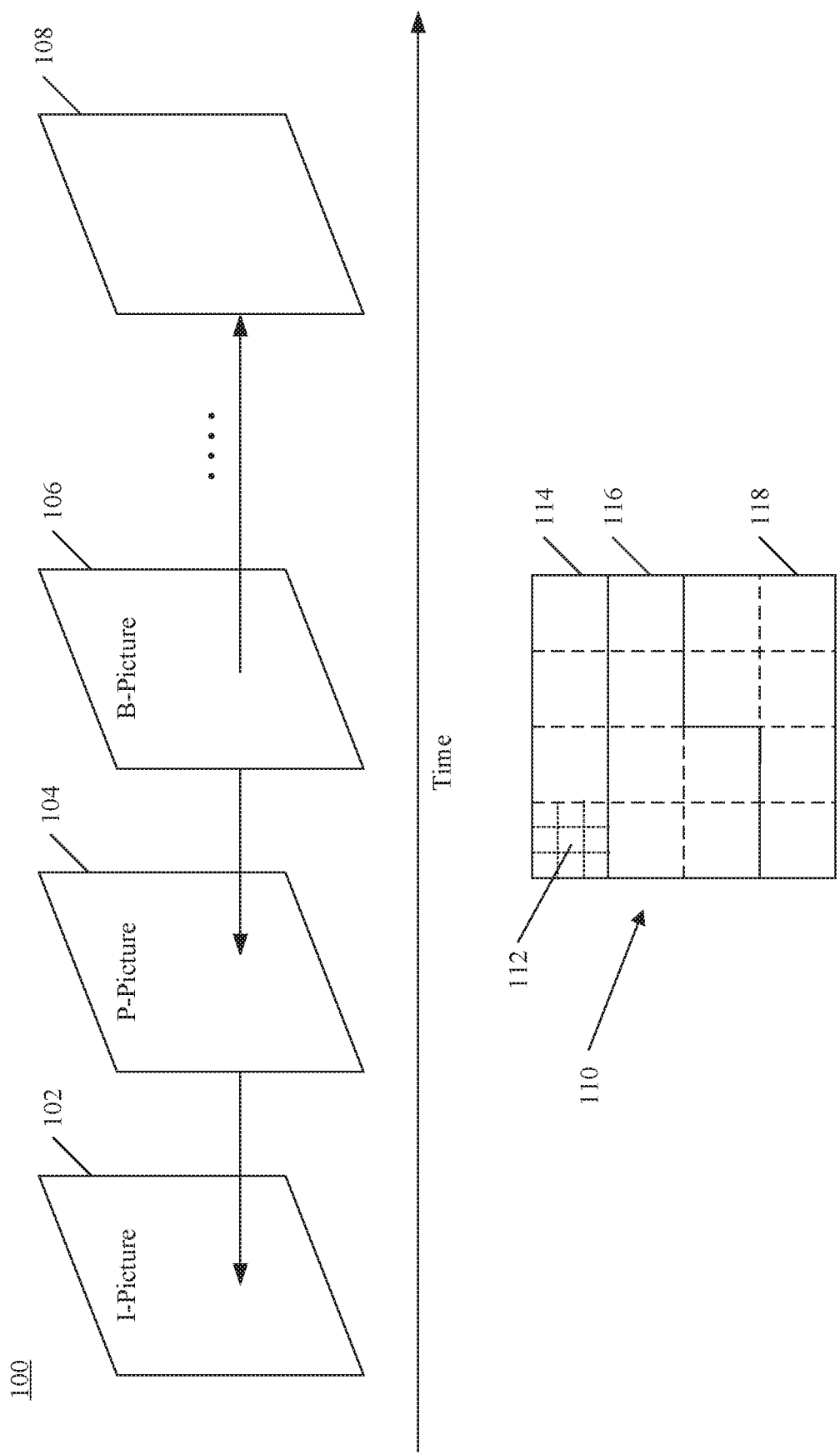
FIG. 1 is a schematic diagram illustrating structures of an example video sequence, according to some embodiments of the present disclosure.

Reference can now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims. Particular aspects of present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
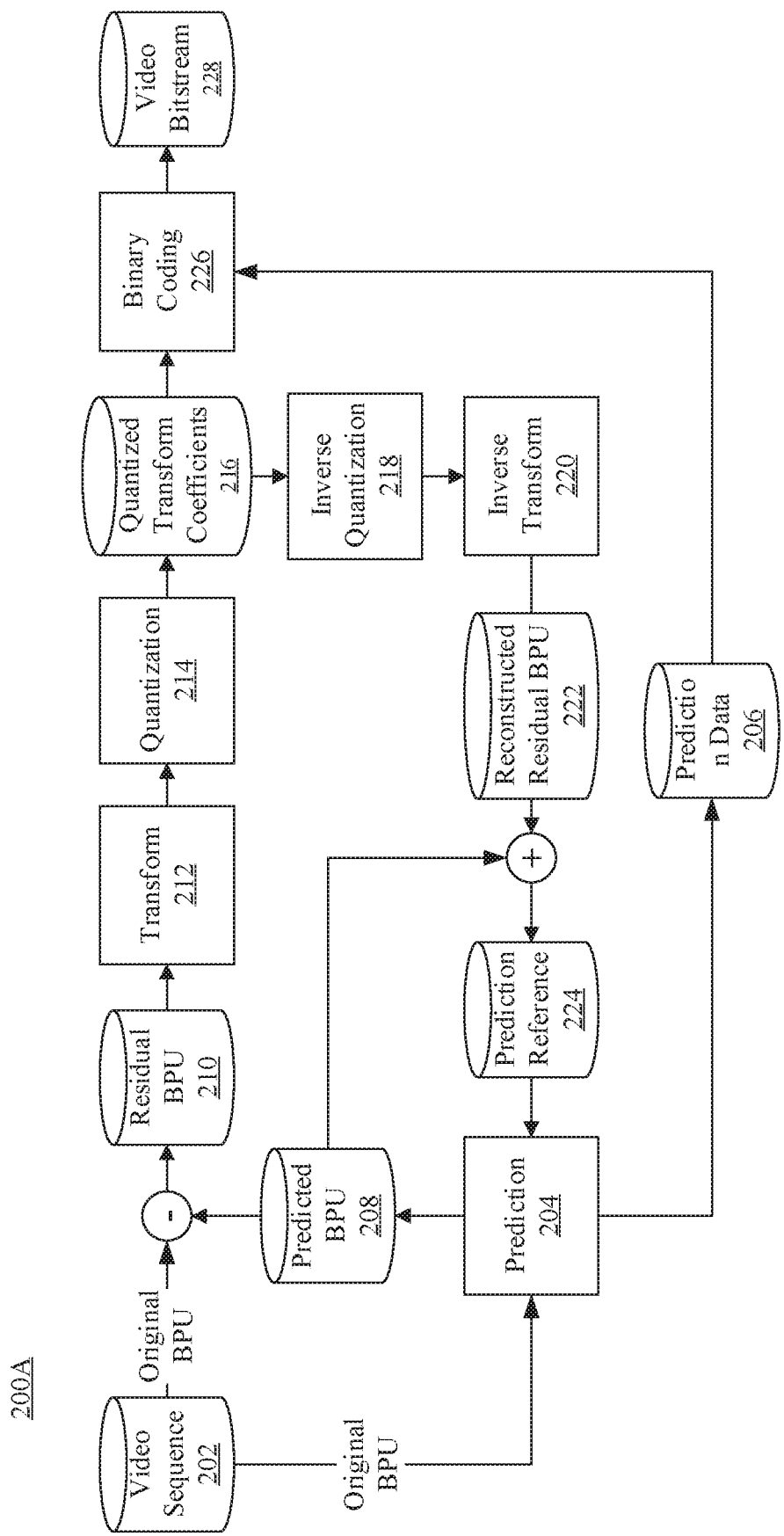
FIG. 2A illustrates a schematic diagram of an example encoding process of a hybrid video coding system, consistent with embodiments of the disclosure.
Figure 2B:
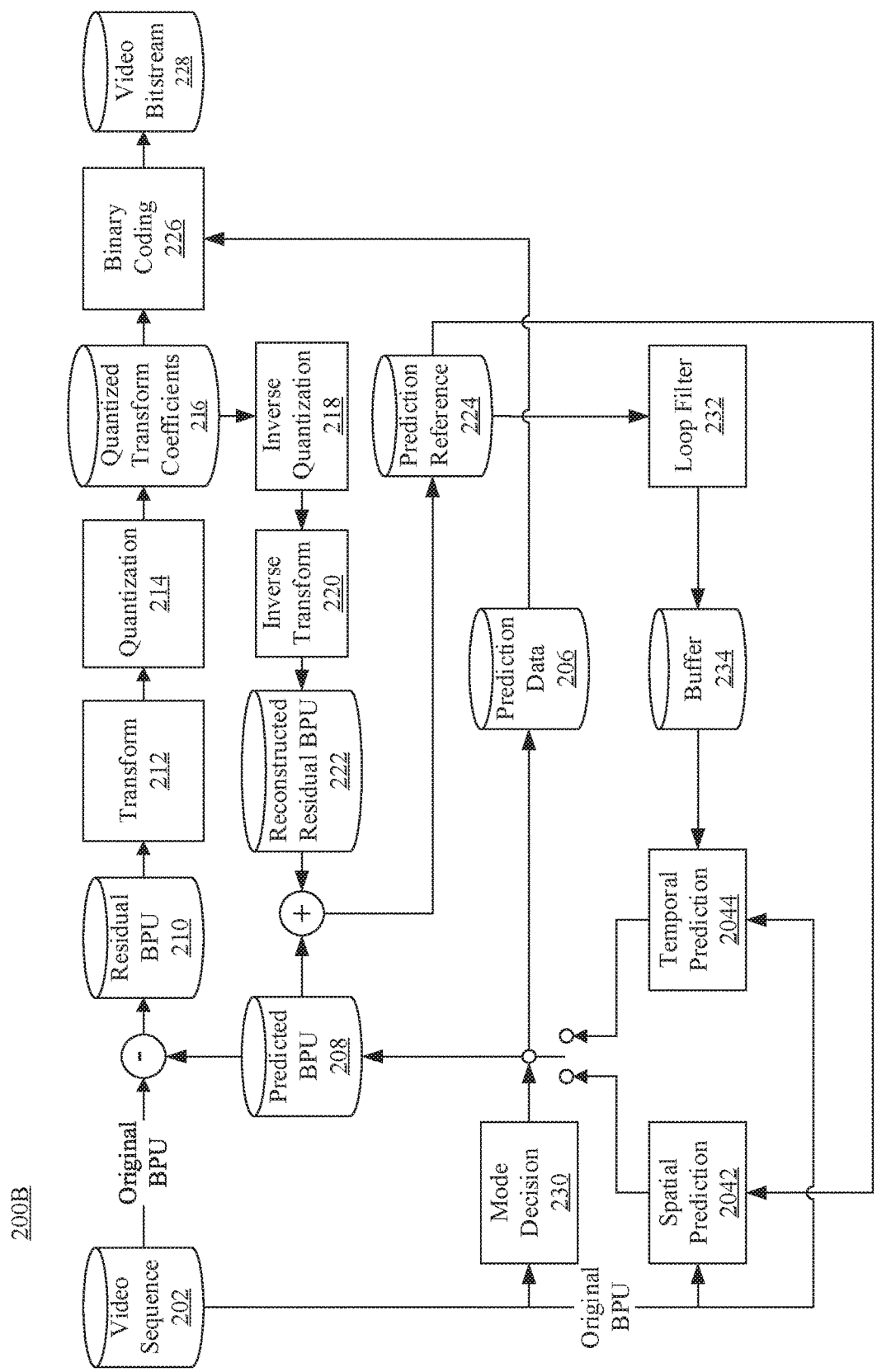
FIG. 2B illustrates a schematic diagram of another example encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
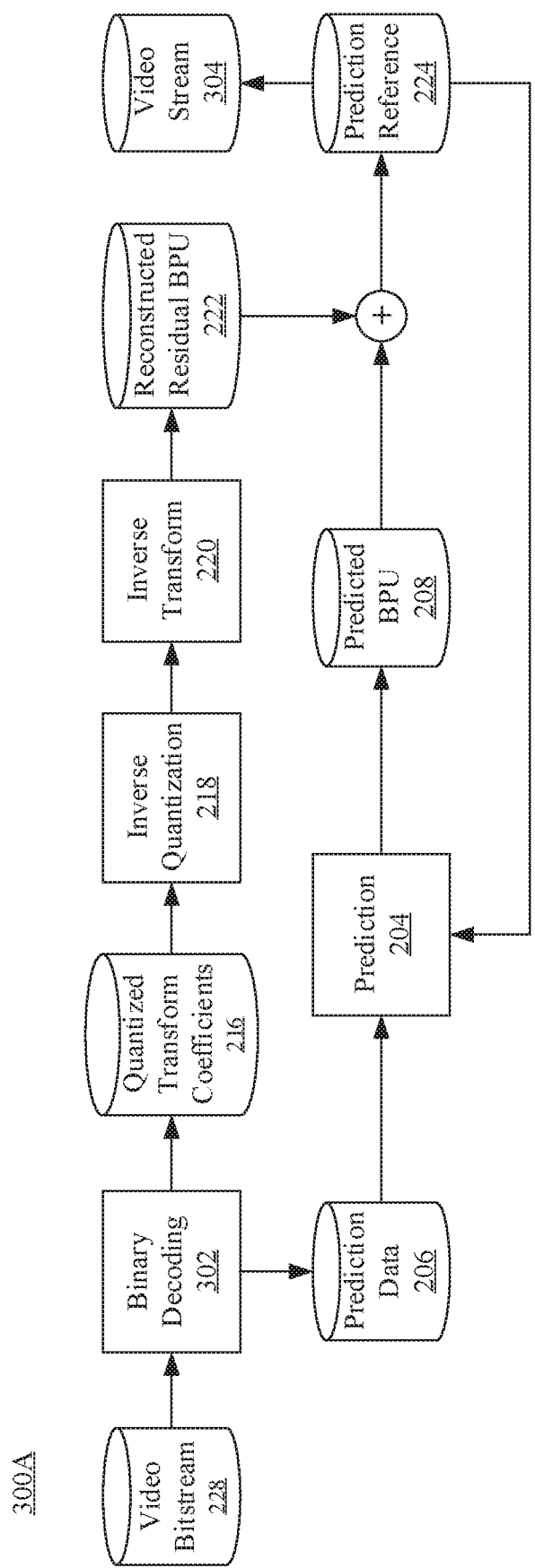
FIG. 3A illustrates a schematic diagram of an example decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
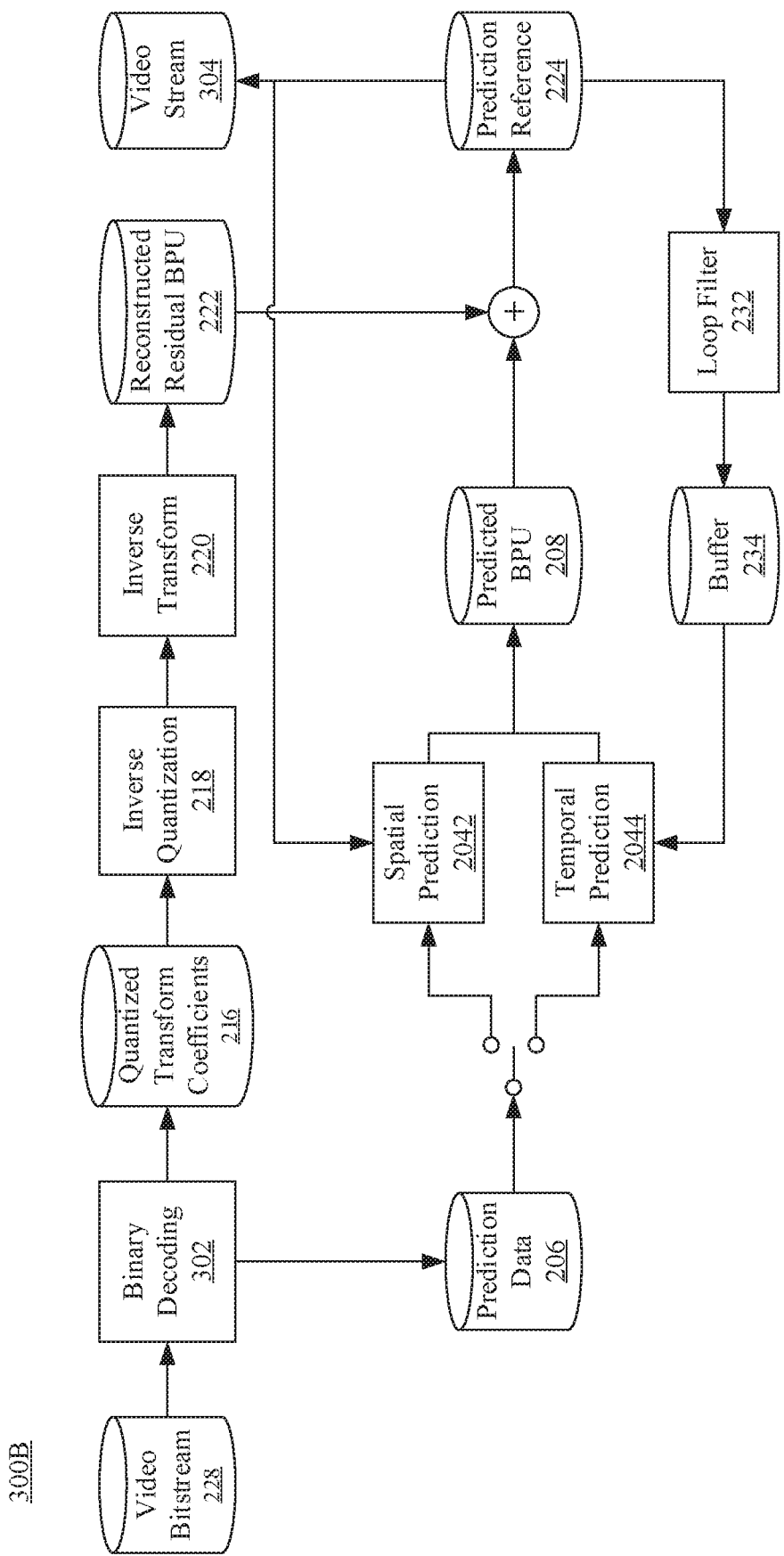
FIG. 3B illustrates a schematic diagram of another example decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
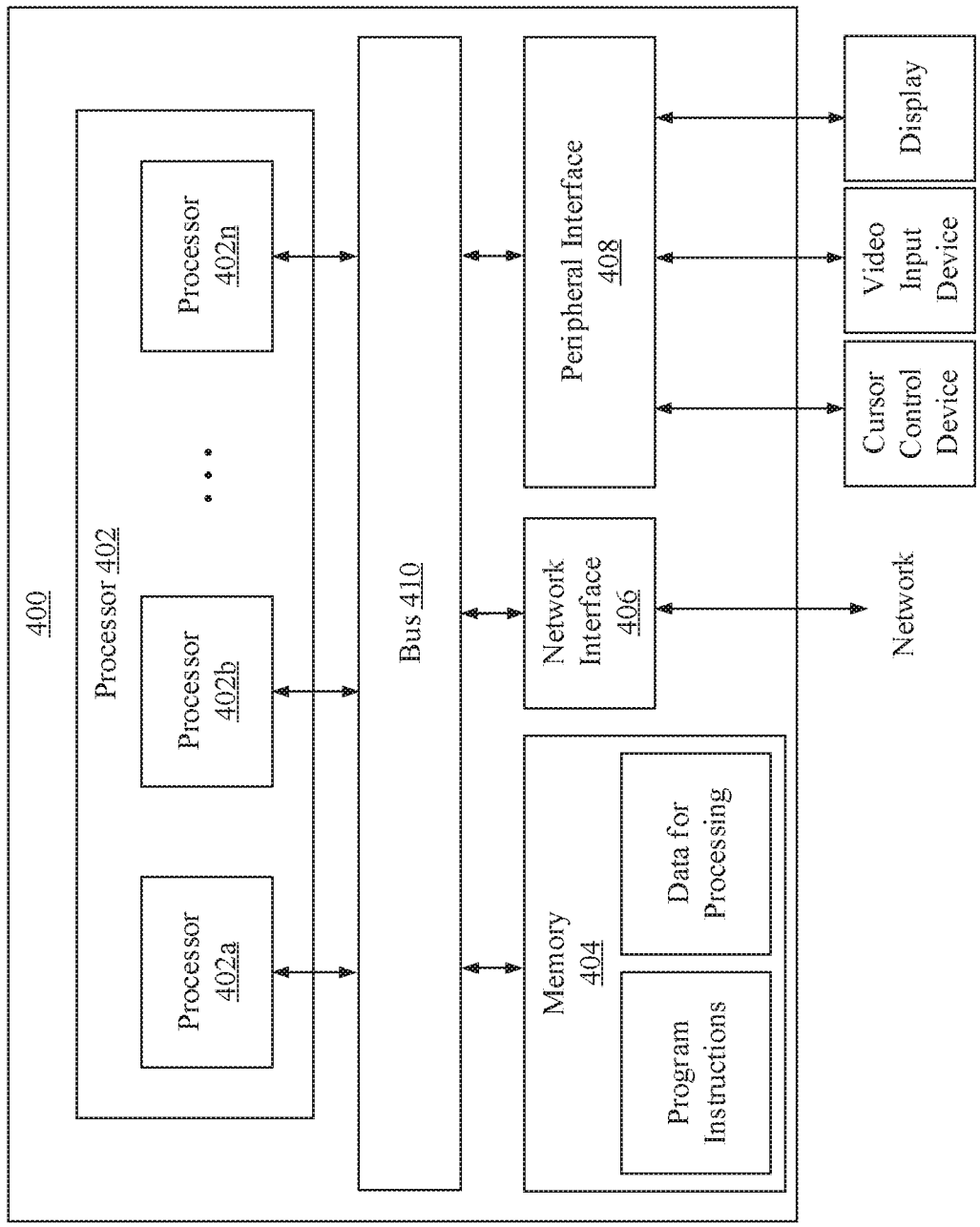
FIG. 4 illustrates a block diagram of an example apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

Figure 5:
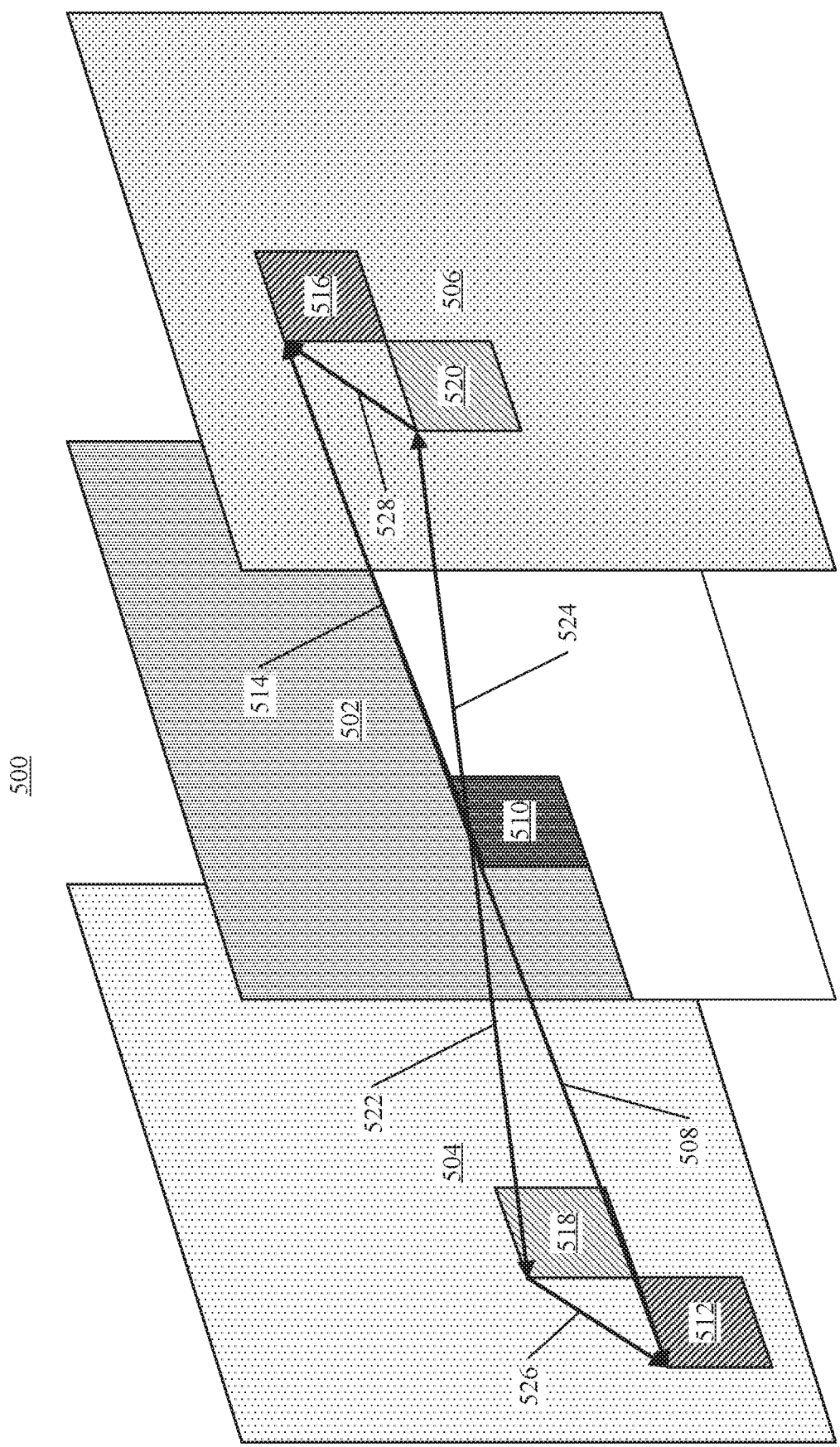
FIG. 5 is a schematic diagram illustrating an example process of decoder side motion vector refinement (DMVR), according to some embodiments of the present disclosure.

In order to increase the accuracy of the motion vectors (MVs) of the merge mode, a bilateral-matching (BM) based decoder side motion vector refinement (DMVR) is adopted in Versatile Video Coding (VVC) draft 6. In bi-prediction operation, a refined MV is searched around the initial MVs in the reference picture list L0 and reference picture list L1. The BM based DMVR calculates the distortion between two candidate blocks in the reference picture list L0 and list L1. FIG. 5 illustrates an example process 500 of decoder side motion vector refinement (DMVR), according to some embodiments of the present disclosure. FIG. 5 shows a current picture 502, a first reference picture 504 in a first reference picture list L0, and a second reference picture 506 in a second reference picture list L1. A first initial MV 508 points from a current block 510 in current picture 502 to a first initial reference block 512 in first reference picture 504. A second initial MV 514 points from current block 510 to a second initial reference block 516 in second reference picture 506. Process 500 can perform BM based DMVR to determine a first candidate reference block 518 in first reference picture 504, a second candidate reference block 520 in second reference picture 506, a first candidate MV 522 connecting current block 510 and first candidate reference block 518, and a second candidate MV 524 connecting current block 510 and second candidate reference block 516. As illustrated in FIG. 5, first candidate MV 522 and second candidate MV 524 are near first initial MV 508 and second initial MV 514, respectively. In some embodiments, process 500 can calculate a sum of absolute difference (SAD) between first initial reference block 518 and second initial reference block 520 based on each MV candidate (e.g., first candidate MV 522 or second candidate MV 524) around the initial MV (e.g., first initial MV 508 or second initial MV 514). The one with the lowest SAD of first candidate MV 522 and second candidate MV 524 can become a refined MV to be used for generating a bi-predicted signal.

In some embodiments, as described in VVC draft 6, the DMVR is applied to the CUs that satisfy all of the following conditions: (1) The merge mode is at CU level with bi-prediction MV; (2) A block is predicted using bi-prediction MV with equal weights (e.g., by not applying bi-prediction with weighted averaging (BWA) to the block; (3) One reference picture is in the past (e.g., first reference picture 504) and another reference picture is in the future (e.g., second reference picture 506) with respect to a current picture (e.g., current picture 502); (4) Distances (e.g., picture order count (POC) differences) from both reference pictures to the current picture are the same; (5) The block has at least 128 luma samples, with block width and height being both at least 8 luma samples.

The refined MV derived by the DMVR process (e.g., process 500) can be used for generating inter prediction samples and for temporal motion vector prediction for future pictures coding. An original MV (e.g., first initial MV 508 or second initial MV 514) can be used in a deblocking process and in spatial MV prediction for future CU coding within a current picture (e.g., current picture 502).

As shown in FIG. 5, a first MV offset 526 represents a refinement offset between first initial MV 508 and first candidate MV 522, and a second MV offset 528 represents a refinement offset between second initial MV 514 and second candidate MV 524. First MV offset 526 and second MV offset 528 can have the same magnitude and opposite directions. In some embodiments, search points can surround the initial MVs (e.g., first initial MV 508 and second initial MV 514), and the MV offsets (e.g., first MV offset 526 and second MV offset 528) can obey an MV difference mirroring rule. For example, points that are checked by DMVR, denoted by a pair of candidate MVs MV0 (e.g., first candidate MV 522) and MV1 (e.g., second candidate MV 524), can be based on Eqs. (1) and (2):

$$MV0'=MV0+MV\_\text{offset} \quad \text{Eq. (1)}$$

$$MV1'=MV1-MV\_\text{offset} \quad \text{Eq. (2)}$$

In Eqs. (1) and (2), MV0' (e.g., first initial MV 508) and MV1' (e.g., second candidate MV 514) represent a pair of initial MVs, MV_offset represents the refinement offset (e.g., first MV offset 526 or second MV offset 528) between the initial MV (e.g., MV0' or MV1') and the refined MVs (e.g., MV0 or MV1). Note that MV_offset is a vector with motion displacements (e.g., in the X and Y dimensions). In some embodiments, as described in VVC draft 5, the refinement search range (e.g., the search range of DMVR) can be two integer luma samples from the initial MV (e.g., first initial MV 508 and second initial MV 514) in both horizontal and vertical dimensions.

Figure 6:
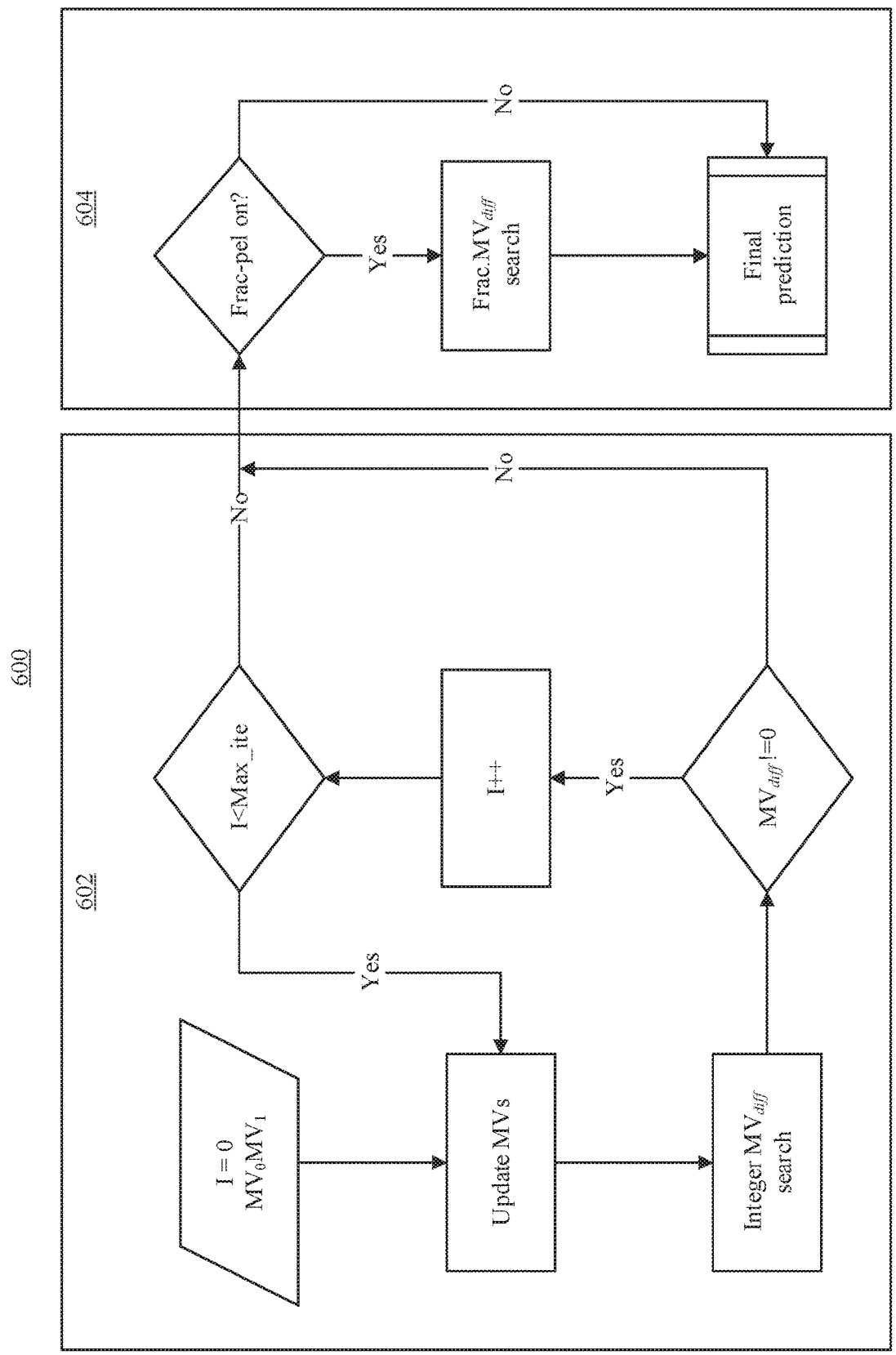
FIG. 6. is a schematic diagram illustrating an example DMVR searching process, according to some embodiments of the present disclosure.

FIG. 6 illustrates an example DMVR searching process 600, according to some embodiments of present disclosure. In some embodiments, process 600 can be performed by a codec (e.g., an encoder in FIGS. 2A-2B or a decoder in FIGS. 3A-3B). For example, the codec can be implemented as one or more software or hardware components of an apparatus (e.g., apparatus 400 in FIG. 4) for encoding or transcoding a video sequence. In some embodiments, process 600 can serve as an example of the searching process of DMVR as described in VVC draft 4. As shown in FIG. 6, process 600 includes a stage 602 for integer sample offset search and a stage 604 for fractional sample refinement. To reduce the search complexity, in some embodiments, a fast searching method with early termination mechanism can be applied in stage 602. For example, rather than using a 25-point full search, a 2-iteration search scheme can be applied in stage 602 to reduce SAD check points.

As shown in FIG. 6, stage 604 can follow stage 602. To save computational complexity, in some embodiments, the fractional sample refinement at stage 604 can be derived using a parametric error surface equation instead of performing additional searches that involve SAD comparison. Stage 604 can be conditionally invoked based on the output of stage 602.

FIG. 7 illustrates an example pattern 700 for DMVR integer luma sample search, according to some embodiments of present disclosure. The DMVR integer luma sample search can determine a point with the smallest SAD in a searched sample. For example, the DMVR integer luma sample search can be implemented as process 600 in FIG. 6, including a stage (e.g., stage 602) for integer sample offset search and a stage (e.g., stage 604) for fractional sample refinement search, in which each stage can be performed in at least one iteration. In some embodiments, in the first iteration of the DMVR integer luma sample search, a maximum of 6 SADs can be checked. Using FIG. 7 as an example, in the first iteration, SADs of five points 702-710 (represented as black blocks) can be compared, in which point 702 can be used as a center point for the search. If the SAD of the center point (i.e., point 702) is smallest, the integer sample stage of DMVR can be terminated. Otherwise, another point 712 (represented as a shaded block), determined by a SAD distribution of points 704-710, can be checked. In the second iteration of the DMVR integer luma sample search, the point with the smallest SAD among points 704-712 can be selected as a new center point for the search. In some embodiments, the second iteration can be performed the same as the first iteration. In some embodiments, the SADs calculated in the first iteration can be re-used in the second iteration, therefore, only SAD of additional points can need to be further calculated.

Figure 8:
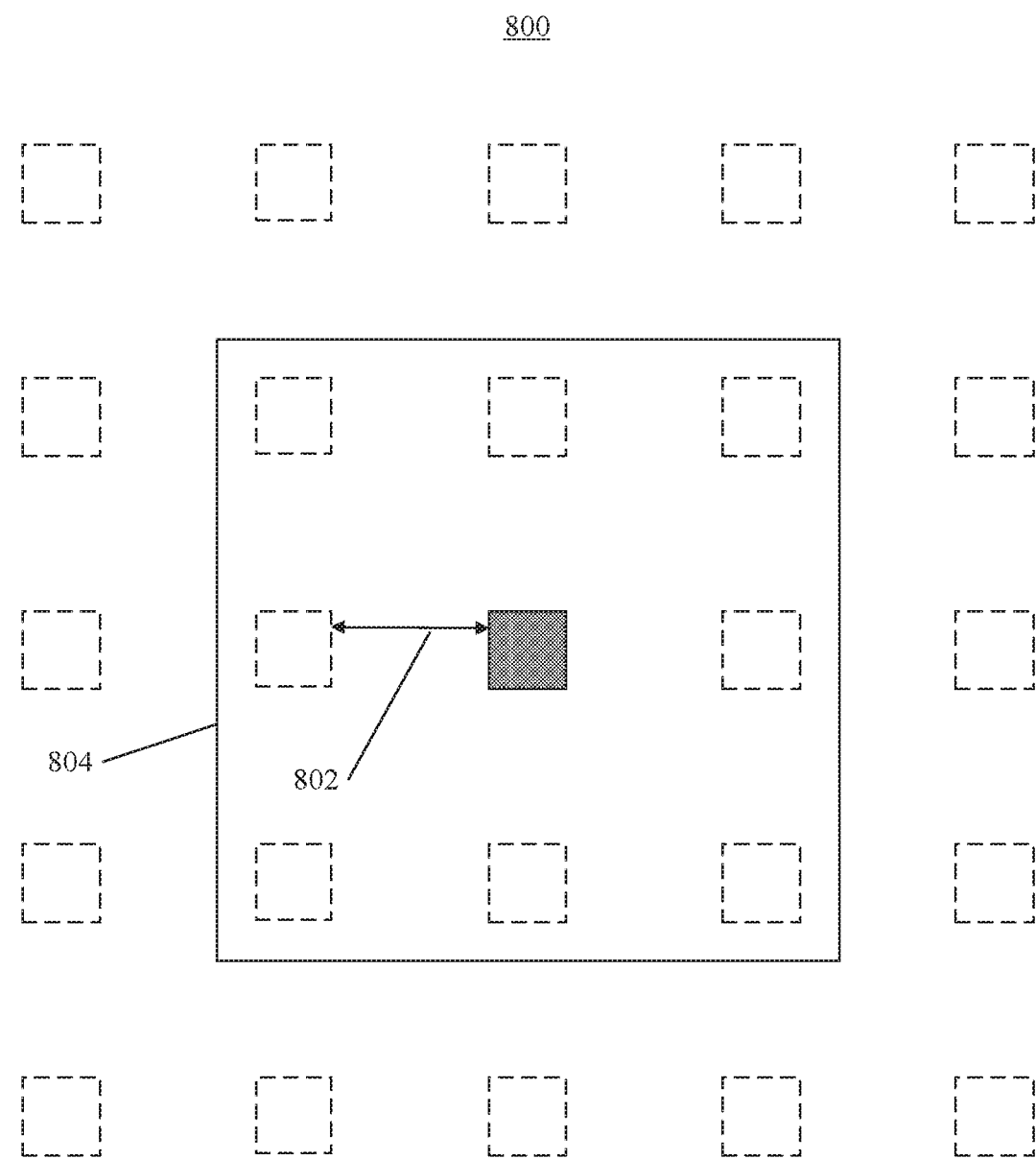
FIG. 8 is a schematic diagram illustrating another example pattern for a stage for integer sample offset search in DMVR integer luma sample searching, according to some embodiments of the present disclosure.

In some embodiments, as described in VVC draft 6, the 2-iteration search as described in FIG. 7 can be removed. Then, in the stage (e.g., stage 602 in FIG. 6) for integer sample offset search, all the SADs of 25 points can be calculated in a single iteration. FIG. 8 illustrates an example pattern 800 for a stage for integer sample offset search in DMVR integer luma sample searching, according to some embodiments of present disclosure. For example, the stage for integer sample offset search can be stage 602 in FIG. 6. FIG. 8 shows an initial MV 802 and 25 points, the SADs of which can be calculated altogether. In some embodiments, the SAD of initial MV 802 can be decreased (e.g., by one quarter) in order to flavor initial MV 802. In some embodiments, the position with the smallest SAD can be further refined in a stage (e.g., stage 604 in FIG. 6) for fractional sample refinement. The stage for fractional sample refinement can be conditionally invoked based on the position with smallest SAD. For example, as shown in FIG. 8, if the position with the smallest SAD is one of the nine points around initial MV 802 (as represented by box 804), the stage for fractional sample refinement can be invoked for determining a refined MV as the output of the DMVR integer luma sample search. If the position with the smallest SAD is none of the nine points around initial MV 802, the position with the smallest SAD can be directly used as the output of the DMVR integer luma sample search.

Figure 9:
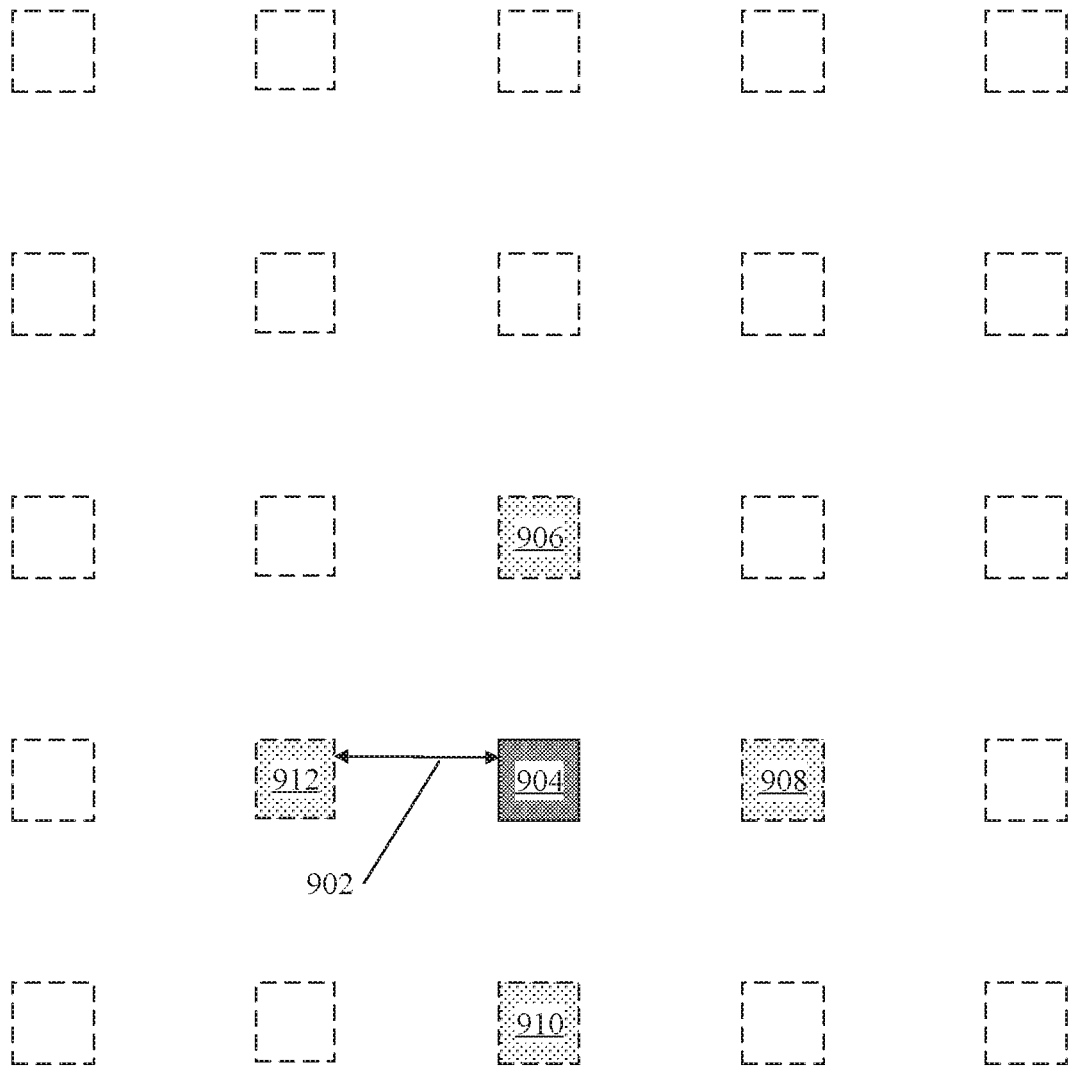
FIG. 9 is a schematic diagram illustrating an example pattern for estimation of DMVR parametric error surface, according to some embodiments of the present disclosure.

FIG. 9 is a schematic diagram illustrating an example pattern 900 for estimation of DMVR parametric error surface, according to some embodiments of present disclosure. FIG. 8 shows an initial MV 902 and 25 points. Initial MV 902 connects to a center point 904 with the smallest SAD. In sub-pixel-offset estimation based on parametric error surface, as shown in FIG. 9, the sum of absolute difference (SAD) cost of center point 904 and the SAD costs at four neighboring points 906-912 around the center point 904 can be used to fit a 2-D parabolic error surface equation. For example, the 2-D parabolic error surface equation can be based on Eq. (3):

$$E(x,y)=((A(x-x_{min})^2+B(y-y_{min})^2+)>>mvShift)+E(0,0) \quad \text{Eq. (3)}$$

In Eq. (3), $(x_{min}, y_{min})$ corresponds to a fractional position with the least SAD cost, E(x,y) corresponds to the SAD cost of the center point 904 and the four neighboring points 906-912, mvShift can be set to 4 as in VVC (in VVC, MV accuracy is 1/16-pel), and A and B can be determined based on Eqs. (4) and (5), respectively:

$$A = \frac{E(-1, 0) + E(1, 0) - 2E(0, 0)}{2} \quad \text{Eq. (4)}$$

$$B = \frac{E(0, -1) + E(0, 1) - 2E(0, 0)}{2} \quad \text{Eq. (5)}$$

By solving Eqs. (3) to (5) using the SAD cost values of the five search points (i.e., points 904-912), $(x_{min}, y_{min})$ can be determined based on Eqs. (6) and (7):

$$x_{min} = \frac{(E(-1, 0) - E(1, 0)) \ll mvShift}{2(E(-1, 0) + E(1, 0) - 2E(0, 0))} \quad \text{Eq. (6)}$$

$$y_{min} = \frac{(E(0, -1) - E(0, 1)) \ll mvShift}{2(E(0, -1) + E(0, 1) - 2E(0, 0))} \quad \text{Eq. (7)}$$

In some embodiments, the values of $x_{min}$ and $y_{min}$ can be automatically constrained to be between −8 and 8 (e.g., in 1/16 sample precision) because all SAD cost values are positive and the smallest value is E(0,0), which corresponds to the half-pel offset with 1/16-pel MV accuracy in VVC. The computed fractional $(x_{min}, y_{min})$ can be added to the integer distance refinement MV to enable the refinement MV to have sub-pel accuracy.

The bi-directional optical flow (BDOF) tool is included in VVC. As its name indicates, the BDOF mode is based on the optical flow concept, which assumes that the motion of an object is smooth. BDOF, previously referred to as BIO, is also included in the Joint Video Exploration Model (JEM) software. Compared to the BIO in JEM, the BDOF in VVC is a simpler version that requires much less computation, especially in terms of number of multiplications and the size of the multiplier.

BDOF can be used to refine the bi-prediction signal of a CU at the 4×4 sub-block level. In some embodiments, BDOF is applied to a CU the following conditions are met: (1) The height of the CU is not 4, and the size of the CU is not 4×8; (2) The CU is not coded using an affine mode or an advanced temporal motion vector prediction (ATMVP) merge mode; (3) The CU is coded using a "true" bi-prediction mode, in which one (e.g., first reference picture 504 in FIG. 5) of the two reference pictures is prior to the current picture (e.g., current picture 502 in FIG. 5) in display order and the other (e.g., second reference picture 506 in FIG. 5) is after the current picture in display order. In some embodiments, BDOF can be applied to the luma component.

In some embodiments, when BDOF is used to refine the bi-prediction signal of a CU at the 4×4 sub-block level, for each 4×4 sub-block, a motion refinement $(v_x, v_y)$ can be calculated by minimizing a difference between the prediction samples in two reference picture lists L0 and L1. $(v_x, v_y)$ can then be used to adjust the bi-predicted sample values in the 4×4 sub-block.

In some embodiments, the following steps are applied in the BDOF process. First, the horizontal and vertical gradients, $$\frac{\partial I^{(k)}}{\partial x}(i, j) \text{ and } \frac{\partial I^{(k)}}{\partial y}(i, j)$$

where k=0,1, of the two prediction signals can be determined based on calculating the difference between two neighboring samples as expressed in Eqs. (8) and (9):

$$\frac{\partial I^{(k)}}{\partial x}(i, j) = \left(I^{(k)}(i+1, j) - I^{(k)}(i-1, j)\right) \gg shift1 \quad \text{Eq. (8)}$$

$$\frac{\partial I^{(k)}}{\partial y}(i, j) = \left(I^{(k)}(i, j+1) - I^{(k)}(i, j-1)\right) \gg shift1 \quad \text{Eq. (9)}$$

In Eqs. (8) and (9), $I^{(k)}(i,j)$ are the sample value at coordinate (i,j) of the prediction signal in list k where k=0,1, and shift1 is calculated based on the luma bit depth ("bitDepth") as Eq. (10):

$$shift1=max(2,14-bitDepth) \quad \text{Eq. (10)}$$

Then, the auto- and cross-correlation of the gradients, $S_1$, $S_2$, $S_3$, $S_5$ and $S_6$, can be determined based on Eqs. (11) to (15):

$$S_1 = \sum_{(i,j)\in\Omega} \psi_x(i,j)\cdot\psi_x(i,j) \qquad \text{Eq. (11)}$$

$$S_2 = \sum_{(i,j)\in\Omega} \psi_x(i,j)\cdot\psi_y(i,j) \qquad \text{Eq. (12)}$$

$$S_3 = \sum_{(i,j)\in\Omega} \theta(i,j)\cdot\psi_x(i,j) \qquad \text{Eq. (13)}$$

$$S_5 = \sum_{(i,j)\in\Omega} \psi_y(i,j)\cdot\psi_y(i,j) \qquad \text{Eq. (14)}$$

$$S_6 = \sum_{(i,j)\in\Omega} \theta(i,j)\cdot\psi_y(i,j) \qquad \text{Eq. (15)}$$

For Eqs. (11) to (15), the values of $\psi_x(i,j)$, $\psi_y(i,j)$, $\theta(i,j)$ can be determined based on Eqs. (16) to (18):

$$\psi_x(i,j) = \left(\frac{\partial I^{(1)}}{\partial x}(i,j) + \frac{\partial I^{(0)}}{\partial x}(i,j)\right) \gg n_a \qquad \text{Eq. (16)}$$

$$\psi_y(i,j) = \left(\frac{\partial I^{(1)}}{\partial y}(i,j) + \frac{\partial I^{(0)}}{\partial y}(i,j)\right) \gg n_a \qquad \text{Eq. (17)}$$

$$\theta(i,j) = \left(I^{(1)}(i,j) \gg n_b\right) - \left(I^{(0)}(i,j) \gg n_b\right) \qquad \text{Eq. (18)}$$

In Eqs. (11) to (18), $\Omega$ is a 6×6 window around the 4×4 sub-block, and the values of $n_a$ and $n_b$ are set to be Eqs. (19) and (20), respectively:

$$n_a = \min(5, \text{bitDepth} - 7) \qquad \text{Eq. (19)}$$

$$n_b = \min(8, \text{bitDepth} - 4) \qquad \text{Eq. (20)}$$

The motion refinement $(v_x, v_y)$ is then derived based on the cross- and auto-correlation terms using Eqs. (21) and (22):

$$v_x = S_1 > 0 ? \text{clip3}(-th'_{BIO}, th'_{BIO}, -((S_3 \cdot 2^{n_b-n_a}) \gg \lfloor \log_2 S_1 \rfloor)) : 0 \qquad \text{Eq. (21)}$$

$$v_y = S_5 > 0 ? \text{clip3}(-th'_{BIO}, th'_{BIO}, -((S_6 \cdot 2^{n_b-n_a} - ((v_x S_{2,m}) \ll n_{s_2} + v_x S_{2,s})/2) \gg \lfloor \log_2 S_2 \rfloor)) : 0 \qquad \text{Eq. (22)}$$

In Eqs. (21) and (22), $$S_{2,m} = S_2 \gg n_{S_2},\ S_{2,s} = S_2\ \&(2^{n_{S_2}} - 1),\ th'_{BIO} = 2^{13-BD},\ \lfloor\cdot\rfloor$$

represents the floor function, and $n_{s_2} = 12$.

Based on the motion refinement and the gradients, the following adjustment $b(x,y)$ can be determined for each sample in the 4×4 sub-block using Eq. (23):

$$b(x,y) = \text{rnd}\left(\left(v_x\left(\frac{\partial I^{(1)}(x,y)}{\partial x} - \frac{\partial I^{(0)}(x,y)}{\partial x}\right)\right)/2\right) + \text{rnd}\left(\left(v_y\left(\frac{\partial I^{(1)}(x,y)}{\partial y} - \frac{\partial I^{(0)}(x,y)}{\partial y}\right)\right)/2\right) \qquad \text{Eq. (23)}$$

Finally, the BDOF samples of the CU can be determined based on adjusting the bi-prediction samples according to Eq. (24):

$$\text{pred}_{BDOF}(x,y) = (I^{(0)}(x,y) + I^{(1)}(x,y) + b(x,y) + \text{offset}) \gg \text{shift} \qquad \text{Eq. (24)}$$

In some embodiments, the values in Eqs. (8) to (23) can be selected such that the multipliers in the BDOF process do not exceed 15-bit, and the maximum bit-width of the intermediate parameters in the BDOF process can be kept within 32-bit.

Figure 10:
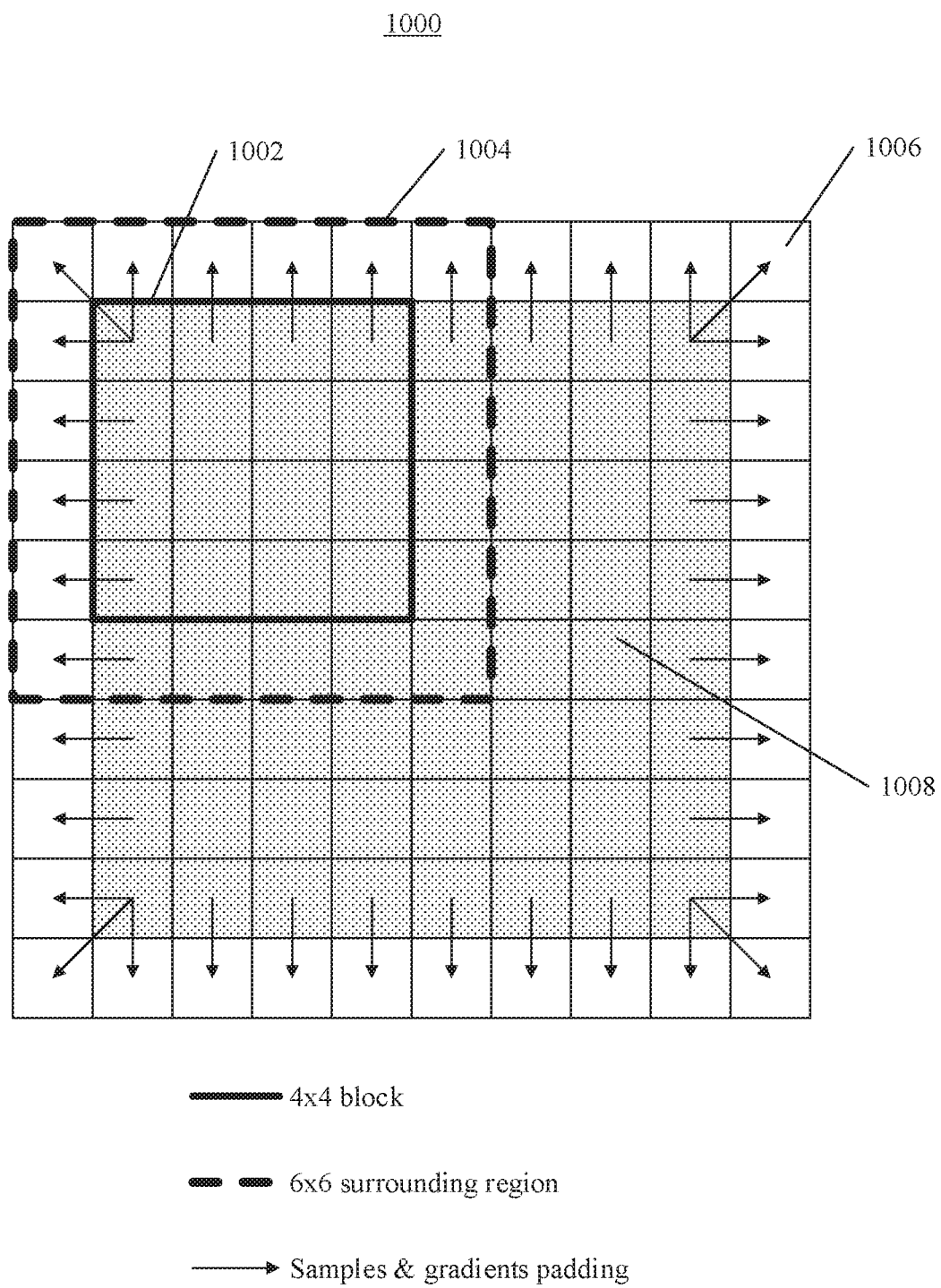
FIG. 10 is a schematic diagram of an example of extended coding unit (CU) region used in bi-directional optical flow (BDOF), according to some embodiments of the present disclosure.

In order to derive the gradient values, some prediction samples $I^{(k)}(i,j)$ in list k(k=0,1) outside of the current CU boundaries can be generated. FIG. 10 is a schematic diagram of an example of extended coding-unit (CU) region 1000 used in BDOF, according to some embodiments of present disclosure. As depicted in FIG. 10, a 4×4 block 1002 (enclosed by a black solid line) used in the BDOF is enclosed by one extended row or column around the boundaries of block 1002 (represented by a black dash line), forming a surrounding region 1004. In order to control the computational complexity of generating out-of-boundary prediction samples, prediction samples in an extended area 1006 (represented by white boxes) can be generated by taking the reference samples at the nearby integer positions (using a flooring operation on the coordinates) directly without interpolation, and the normal 8-tap motion compensation interpolation filter can be used to generate prediction samples within the CU 1008 (represented by gray boxes). These extended sample values can be used in gradient calculation only. For the remaining steps in the BDOF process, if any sample and gradient value outside the boundaries of CU 1008 are needed, they can be padded (or repeated) from their nearest neighbors.

In the JVET meetings, a coding tool called prediction refinement with optical flow (PROF) was adopted. PROF improves the accuracy of affine motion compensated prediction by refining the sub-block based affine motion compensated prediction with optical flow. Affine motion model parameters can be used to derive the motion vector of each sample position in a CU. However, due to the high complexity and memory access bandwidth for generating sample-by-sample affine motion compensated prediction, affine prediction in VVC uses a sub-block based affine motion compensation method, where a CU is divided into 4×4 sub-blocks, each of which is assigned with an MV derived from the affine CU's control point MVs. The sub-block based affine motion compensation is a trade-off between coding efficiency, complexity, and memory access bandwidth. It loses some prediction accuracy due to sub-block-based prediction instead of the theoretical sample-based motion compensated prediction.

To achieve a finer granularity of affine motion compensation, in some embodiments, PROF can be applied after regular subblock based affine motion compensation. A sample-based refinement can be derived based on an optical flow equation, such as Eq. (25):

$$\Delta I(i,j) = g_x(i,j) * \Delta v_x(i,j) + g_y(i,j) * \Delta v_y(i,j) \qquad \text{Eq. (25)}$$

In Eq. (25), $g_x(i,j)$ and $g_y(i,j)$ are the spatial gradients at sample position (i,j). $\Delta V$ is the motion offset from the sub-block based motion vector to the sample-based motion vector derived from the affine model parameters.

Figure 11:
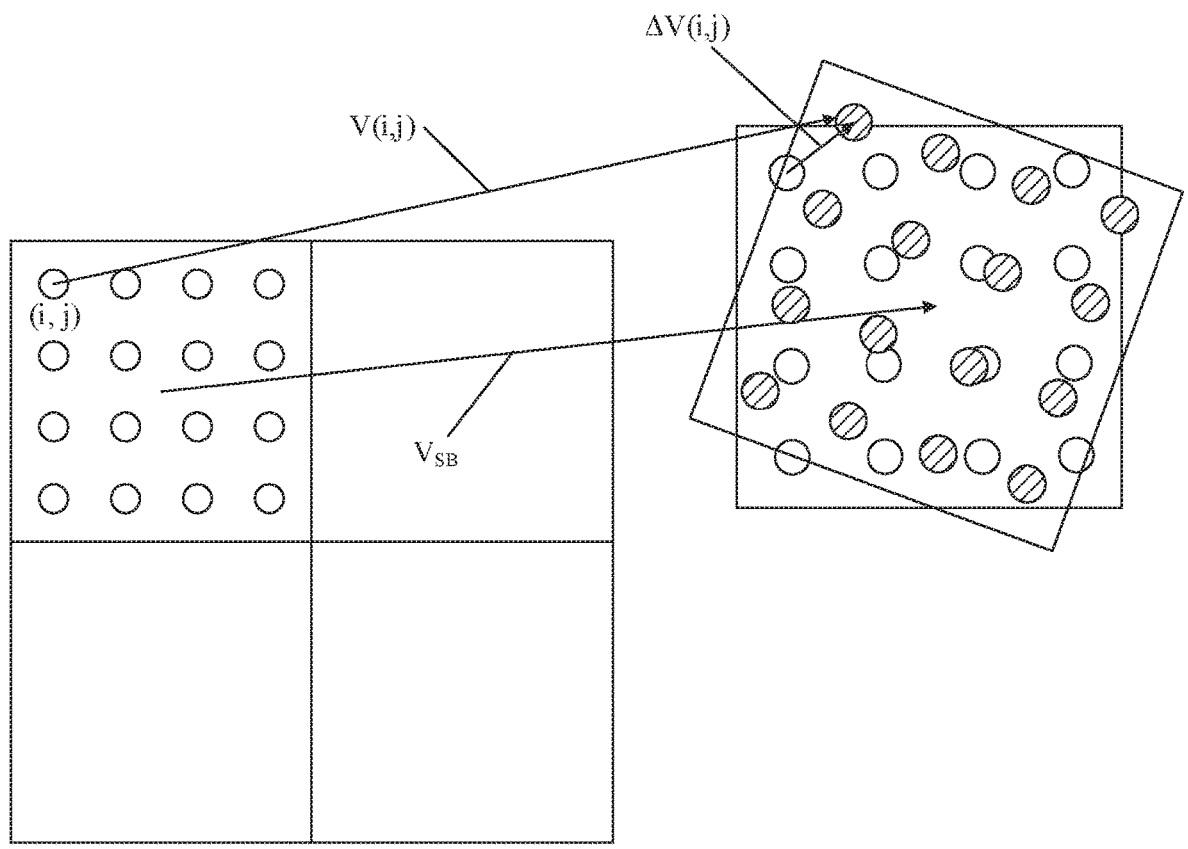
FIG. 11 is a schematic diagram of an example of sub-block based affine motion and sample-based affine motion, according to some embodiments of the present disclosure.

FIG. 11 is a schematic diagram of an example of sub-block based translational motion and sample-based affine motion, according to some embodiments of the present disclosure. As shown in FIG. 11, V(i,j) is the theoretical motion vector for the sample position (i,j) derived using an affine model, $V_{SB}$ is the subblock based motion vector, and $\Delta V(i,j)$ (represented as a dotted arrow) is the difference between V(i,j) and $V_{SB}$.

Then, the prediction refinement $\Delta I(i,j)$ can be added to the sub-block prediction I(i,j). The final prediction I' can be generated based on Eq. (26):

$$I'(i,j)=I(i,j)+\Delta I(i,j) \qquad \text{Eq. (26)}$$

Consistent with the disclosed embodiments, both DMVR and BDOF can have control flags at two levels in the syntax structure. The first control flag can be sent in the Sequence Parameter Set (SPS) on the sequence level and the second one can be sent in the slice header on the slice level. FIG. 12 illustrates Table 1 showing an example syntax structure of a Sequence Parameter Set (SPS) implementing control flags for DMVR and BDOF, according to some embodiments of the present disclosure. As shown in Table 1 of FIG. 12, sps_bdof_enabled_flag and sps_dmvr_enabled_flag are the control flags for BDOF and DMVR, respectively, at a sequence level which are sent in SPS. When sps_bdof_enabled_flag or sps_dmvr_enabled_flag is false, BDOF or DMVR can be disabled in the entire video sequence that refers to this SPS. When sps_bdof_enabled_flag and sps_dmvr_enabled_flag are true, BDOF or DMVR can be enabled for the current video sequence. In this case, another flag sps_bdof_dmvr_slice_present_flag can be further signaled to indicate whether slice-level controlling of BDOF and DMVR is enabled.

FIG. 13 illustrates Table 2 showing an example syntax structure of a slice header implementing control flags for DMVR and BDOF, according to some embodiments of the present disclosure. As shown in Table 2, when sps_bdof_dmvr_slice_present_flag as set in Table 1 is true, slice_disable_bdof_dmvr_flag can be signaled in the slice header to indicate whether BDOF and DMVR are disabled for the current slice.

FIGS. 12-13 show a two-level control mechanism for DMVR and BDOF. By using such a mechanism, an encoder (e.g., an encoder implementing processes 200A or 200B in FIGS. 2A-2B) can use the slice-level flag slice_disable_bdof_dmvr_flag to switch DMVR and BDOF on or off for individual slices. Such a slice level adaptation can have two benefits: (1) When at least one of DMVR or BDOF is not useful for the current slice, switching it (or them) off can improve coding performance; (2) DMVR and BDOF have relatively high computational complexity, therefore switching them off can reduce the encoding and decoding complexity of the current slice.

In the disclosed embodiments, control flags for PROF can also be used in both the sequence level and the slice level. In some embodiments, three separate flags can be signaled in SPS to indicate whether DMVR, BDOF, and PROF are enabled, respectively. If any of them is enabled, a corresponding lower level control enabling flag can be signaled to indicated whether the enabled tool is controlled in the lower level. The lower level may be slice level or picture level. If slice-level or picture-level controlling is enabled, then, in each slice header or picture header, a slice-level or picture-level disabling flag can be signaled to indicate whether the enabled tool is disabled for the current slice or picture.

Consistent with the disclosed embodiments, FIG. 14A illustrates Table 3A showing an example syntax structure of a Sequence Parameter Set (SPS) implementing slice-level control flags for DMVR, BDOF, and PROF, according to some embodiments of the present disclosure. FIG. 14B illustrates Table 3B showing an example syntax structure of an SPS implementing picture-level control flags for DMVR, BDOF, and PROF, according to some embodiments of the present disclosure. As shown in Tables 3A-3B with emphases shown in italics, sps_bdof_enabled_flag, sps_dmvr_enabled_flag, and sps_affine_prof_enabled_flag are the flags signaled in the SPS to indicate whether BDOF, DMVR, and PROF is enabled for the video sequence, respectively. If BDOF, DMVR, or PROF is enabled, as shown in Table 3A, sps_bdof_slice_present_flag, sps_dmvr_slice_present_flag, or sps_affine_prof_slice_present_flag can be further signaled, respectively, to indicate whether slice-level controlling of BDOF, DMVR, and PROF is enabled. If BDOF, DMVR, or PROF is enabled, as shown in Table 3B, sps_bdof_picture_present_flag, sps_dmvr_picture_present_flag, or sps_affine_prof_picture_present_flag can be further signaled, respectively, to indicate whether picture-level controlling of BDOF, DMVR, and PROF is enabled.

FIG. 15A illustrates Table 4A showing an example syntax structure of a slice header implementing control flags for DMVR, BDOF, and PROF, according to some embodiments of the present disclosure. As shown in Table 4A with emphases shown in italics, if any of sps_bdof_slice_present_flag, sps_dmvr_slice_present_flag, or sps_affine_prof_slice_present_flag as set in Table 3A is true, then slice_disable_bdof_flag, slice_disable_dmvr_flag, or slice_disable_affine_prof_flag can be signaled, respectively, to indicated whether BDOF, DMVR, or PROF is disabled for the current slice. FIG. 15B illustrates Table 4B showing an example syntax structure of a picture header implementing control flags for DMVR, BDOF, and PROF, according to some embodiments of the present disclosure. As shown in Table 4B with emphases shown in italics, if any of sps_bdof_picture_present_flag, sps_dmvr_picture_present_flag, or sps_affine_profpicture_present_flag as set in Table 3B is true, then ph_disable_bdof_flag, ph_disable_dmvr_flag, or ph_disable_affine_prof_flag can be signaled, respectively, to indicated whether BDOF, DMVR, or PROF is disabled for the current picture.

In some embodiments, DMVR, BDOF, PROF can have three separate sequence-level enabling flags but share the same slice-level control enabling flags. For example, one slice-level disabling flag can be signaled for DMVR, BDOF, PROF. In another example, three slice-level disabling flags can be signaled for DMVR, BDOF, PROF separately. As another example, two slice-level disabling flags can be signaled for DMVR, BDOF, PROF. It should be noted that various syntax structures can be implemented for the controlling of DMVR, BDOF, PROF at the sequence level and a level lower than the sequence level (referred to as "lower level" herein, such as the slice level or the picture level), which are not limited to the examples described herein.

FIG. 16 illustrates Table 5 showing an example syntax structure of a Sequence Parameter Set (SPS) implementing separate sequence-level control flags for DMVR, BDOF, and PROF, according to some embodiments of the present disclosure. As shown in Table 5 with emphases shown in italics, three separate flags sps_bdof_enabled_flag, sps_dmvr_enabled_flag, and sps_affine_prof_enabled_flag are signaled in SPS to indicate whether DMVR, BDOF, and PROF are enabled, respectively. If at least one of DMVR, BDOF, or PROF is enabled, a slice control enabling flag sps_bdof_dmvr_affine_prof_slice_present_flag can be signaled to indicate whether the at least one of DMVR, BDOF, or PROF enabled at the sequence level is controlled in the lower level.

FIG. 17 illustrates Table 6 showing an example syntax structure of a slice header implementing a joint control flag for DMVR, BDOF, and PROF, according to some embodiments of the present disclosure. As shown in Table 6 with emphases shown in italics, if slice-level controlling is enabled as described in Table 5 (e.g., sps_bdof_dmvr_affine_prof_slice_present_flag is true), then, in each slice header, a slice-level disabling flag slice_disable_bdof_dmvr_affine_prof_flag can be signaled to indicate whether the at least one of DMVR, BDOF, or PROF enabled at the sequence level is disabled for the current slice. In the syntax structure shown of Table 6, if a plurality of DMVR, BDOF, and PROF are enabled in sequence level, the plurality of enabled ones can be jointly controlled in slice level if slice-level controlling is enabled.

FIG. 18 illustrates Table 7 showing an example syntax structure of a slice header implementing separate control flags for DMVR, BDOF, and PROF, according to some embodiments of the present disclosure. As shown in Table 7 with emphases shown in italics, if slice-level controlling is enabled as described in Table 5 (e.g., sps_bdof_dmvr_affine_prof_slice_present_flag is true), then, for an enabled one of DMVR, BDOF, and PROF at the sequence level, a slice-level disabling flag can be signaled to indicate whether the enabled one is disabled for the current slice. For example, if sps_bdof_enabled_flag and sps_bdof_dmvr_affine_prof_slice_present_flag in Table 5 are set as true, slice_disable_bdof_flag in Table 7 can be signaled to indicate whether BDOF is disabled for the current slice. As another example, if sps_dmvr_enabled_flag and sps_bdof_dmvr_affine_prof_slice_present_flag in Table 5 are set as true, slice_disable_dmvr_flag in Table 7 can be signaled to indicate whether DMVR is disabled for the current slice. In yet another example, if sps_affine_prof_enabled_flag and sps_bdof_dmvr_affine_prof_slice_present_flag in Table 5 are set as true, slice_disable_affine_prof_flag in Table 7 can be signaled to indicate whether PROF is disabled for the current slice. In Table 7, each of DMVR, BDOF, and PROF can be separately controlled in slice level if slice-level controlling is enabled.

Considering the fact that both BDOF and PROF uses optical flow to refine the inter predictor, in some embodiments, BDOF and PROF can share the same slice-level control flag, and DMVR can use a separate slice-level control flag. FIG. 19 illustrates Table 8 showing an example syntax structure of a slice header implementing hybrid control flags for DMVR, BDOF, and PROF, according to some embodiments of the present disclosure. In the syntax structure of Table 8, BDOF and PROF can share the same slice-level disabling flag, and DMVR can use another slice-level disabling flag. As shown in Table 8 with emphases shown in italics, if slice-level controlling is enabled in Table 5 (e.g., sps_bdof_dmvr_affine_prof_slice_present_flag is true), two slice-level disabling flags can be signaled to indicate whether DMVR, BDOF, and PROF are disabled for the current slice. For example, if at least one of sps_bdof_enabled_flag and sps_affine_prof_enabled_flag in Table 5 is set as true, and sps_bdof_dmvr_affine_prof_slice_present_flag in Table 5 is set as true, then slice_disable_bdof_affine_prof_flag in Table 8 can be signaled to indicate whether the at least one of BDOF or PROF enabled at the sequence level is disabled for the current slice. In another example, if sps_dmvr_enabled_flag and sps_bdof_dmvr_affine_prof_slice_present_flag in Table 5 are set as true, then slice_disable_dmvr_flag in Table 8 can be signaled to indicate whether DMVR is disabled for the current slice. In Table 8, BDOF and PROF are jointly controlled in slice level, and DMVR are controlled separately from BDOF and PROF, if slice level controlling is enabled. FIG. 20 illustrates Table 9 showing an example syntax structure of a Sequence Parameter Set (SPS) implementing hybrid sequence-level control flags for DMVR, BDOF, and PROF, according to some embodiments of the present disclosure. In the syntax structure of Table 9, three slice-level disabling flags can be signaled for DMVR, BDOF, and PROF separately. As shown in Table 9 with emphases shown in italics, three separate flags sps_bdof_enabled_flag, sps_dmvr_enabled_flag, and sps_affine_prof_enabled_flag can be signaled in SPS to indicate whether DMVR, BDOF, or PROF are enabled, respectively. If sps_dmvr_enabled_flag is true, a slice-level control enabling flag sps_dmvr_slice_present_flag can be signaled to indicate whether DMVR is controlled in the slice level. If at least one of sps_bdof_enabled_flag or sps_affine_prof_enabled_flag is true, a slice-level control enabling flag sps_bdof_affine_prof_slice_present_flag can be signaled to indicate whether at least one of BDOF or PROF is controlled in the slice-level.

FIG. 21 illustrates Table 10 showing another example syntax structure of a slice header implementing hybrid control flags for DMVR, BDOF, and PROF, according to some embodiments of the present disclosure. As shown in Table 10 with emphases shown in italics, if sps_dmvr_slice_present_flag in Table 9 is set as true, a slice-level disabling flag slice_disable_dmvr_flag can be signaled to indicated whether DMVR is disabled for the current slice. If sps_bdof_affine_prof_slice_present_flag in Table 9 is set as true, a slice-level disabling flag slice_disable_bdof_affine_prof_flag can be signaled to indicated whether the at least one of BDOF or PROF enabled in the sequence level (as described in Table 8) can be disabled for the current slice. In the syntax structure of Table 9, BDOF and PROF can be jointly controlled in the slice level, and DMVR can be separately controlled in the slice level, if slice-level controlling is enabled.

FIG. 22 illustrates Table 11 showing another example syntax structure of a slice header implementing separate control flags for DMVR, BDOF, and PROF, according to some embodiments of the present disclosure. As shown in Table 11 with emphases shown in italics, if sps_dmvr_enabled_flag in Table 9 is set as true, a slice-level disabling flag slice_disable_dmvr_flag can be signaled to indicate whether DMVR is disabled for the current slice. If sps_bdof_enabled_flag and sps_bdof_affine_prof_slice_present_flag in Table 9 are set as true, a slice-level disabling flag slice_disable_bdof_flag can be signaled to indicate whether BDOF is disabled for the current slice. If sps_affine_prof_enabled_flag and sps_bdof_affine_prof_slice_present_flag in Table 9 are set as true, a slice-level disabling flag slice_disable_affine_prof_flag can be signaled to indicate whether PROF is disabled for the current slice. In the syntax structure of Table 11, each of DMVR, BDOF, and PROF is separately controlled in the slice level if slice-level controlling is enabled.

FIGS. 23-26 illustrate flowcharts of example processes 2300-2600 of controlling a video coding mode, according to some embodiments of this disclosure. In some embodiments, processes 2300-2600 can be performed by a codec (e.g., an encoder in FIGS. 2A-2B or a decoder in FIGS. 3A-3B). For example, the codec can be implemented as one or more software or hardware components of an apparatus (e.g., apparatus 400) for controlling a coding mode of encoding or decoding a video sequence.

Figure 23:
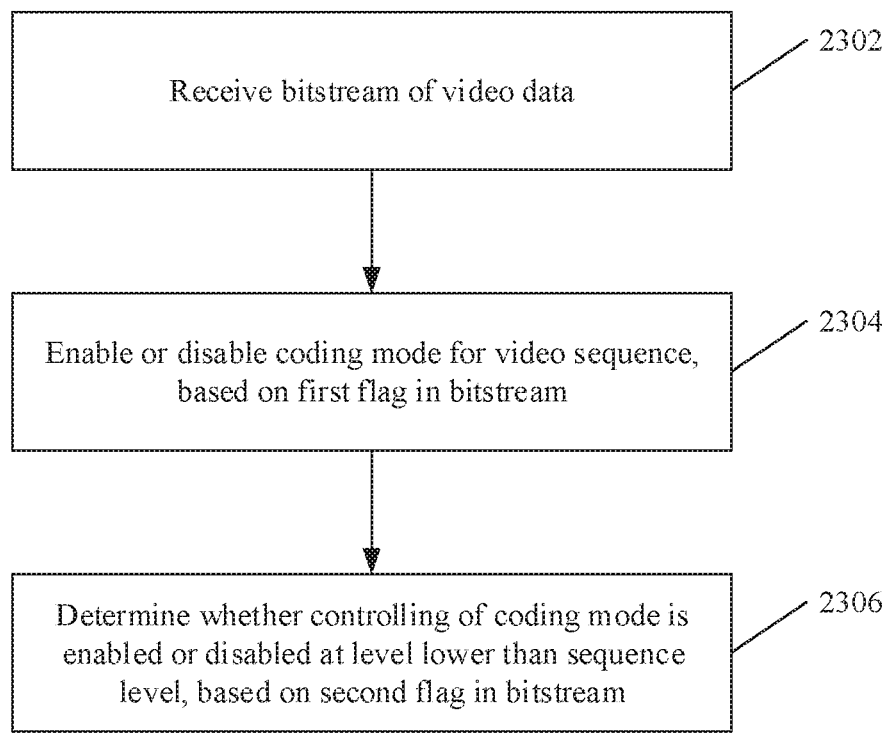
FIG. 23 illustrates a flowchart of an example process of controlling a video decoding mode, according to some embodiments of this disclosure.

FIG. 23 illustrates a flowchart of an example process 2300 of controlling a video decoding mode, according to some embodiments of this disclosure. At step 2302, a codec (e.g., a decoder in FIGS. 3A-3B) can receive a bitstream of video data (e.g., video bitstream 228 in process 300A or 300B in FIGS. 3A-3B).

At step 2304, the codec can enable or disable a coding mode for a video sequence (e.g., video stream 304 in process 300A or 300B in FIGS. 3A-3B), based on a first flag in the bitstream. For example, the coding mode can be at least one of a bi-directional optical flow (BDOF) mode, a prediction refinement with optical flow (PROF) mode, or a decoder side motion vector refinement (DMVR) mode. In some embodiments, the codec can detect the first flag in a Sequence Parameter Set (SPS) of the video sequence. For example, the first flag can be the flag sps_bdof_enabled_flag, the flag sps_dmvr_enabled_flag, or the flag sps_affine_prof_enabled_flag as described in FIG. 12, 14A-14B, 16, or 20.

At step 2306, the codec can determine whether controlling of the coding mode is enabled or disabled at a level lower than a sequence level, based on a second flag in the bitstream. The level lower than the sequence level can include a slice level or a picture level. In some embodiments, the codec can detect the second flag in the SPS of the video sequence in response to the coding mode being enabled for the video sequence. For example, the second flag can be the flag sps_bdof_dmvr_slice_present_flag, the flag sps_bdof_slice_present_flag, the flag sps_dmvr_slice_present_flag, the flag sps_affine_prof_slice_present_flag, the flag sps_bdof_picture_present_flag, the flag sps_dmvr_picture_present_flag, the flag sps_affine_prof_picture_present_flag, the flag sps_bdof_affine_prof_slice_present_flag, or the flag sps_bdof_dmvr_affine_prof_slice_present_flag as described in FIG. 12, 14A-14B, 16, or 20.

In some embodiments, after step 2306, in response to the controlling of the coding mode being enabled at the level lower than the sequence level, the codec can enable or disable the coding mode for a target lower-level region based on a third flag in the bitstream. The target lower-level region can be a target slice or a target picture. If the lower level is the slice level, in some embodiments, the codec can detect the third flag in a slice header of the target slice. If the lower level is the picture level, in some embodiments, the codec can detect the third flag in a picture header of the target picture. For example, the third flag can be the flag slice_disable_bdof_dmvr_flag, the flag slice_disable_bdof_flag, the flag slice_disable_dmvr_flag, the flag slice_disable_affine_prof_flag, the flag ph_disable_bdof_flag, the flag ph_disable_dmvr_flag, the flag ph_disable_affine_prof_flag, the flag slice_disable_bdof_dmvr_affine_prof_flag, or the flag slice_disable_bdof_affine_prof_flag as described in FIG. 13, 15A-15B, 17-19, or 21-22.

Figure 24:
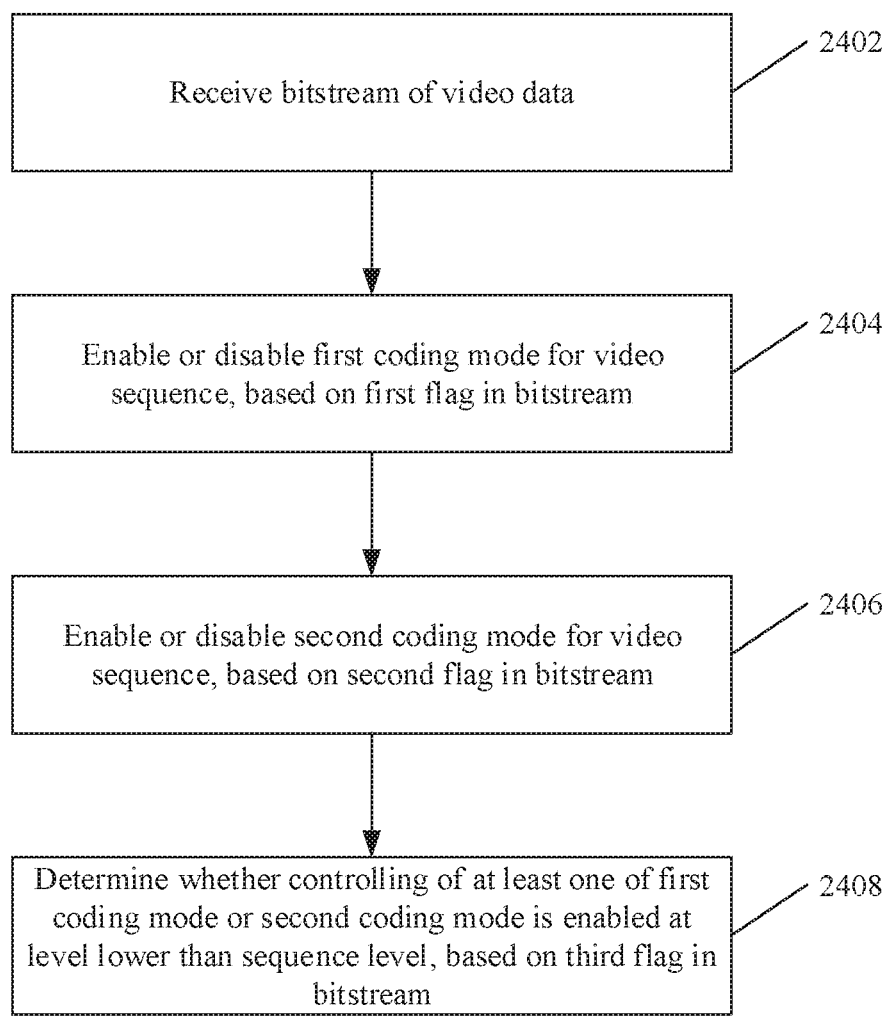
FIG. 24 illustrates a flowchart of another example process of controlling a video decoding mode, according to some embodiments of this disclosure.

FIG. 24 illustrates a flowchart of another example process 2400 of controlling a video decoding mode, according to some embodiments of this disclosure. At step 2402, a codec (e.g., a decoder in FIGS. 3A-3B) can receive a bitstream of video data (e.g., video bitstream 228 in process 300A or 300B in FIGS. 3A-3B).

At step 2404, the codec can enable or disable a first coding mode for a video sequence (e.g., video stream 304 in process 300A or 300B in FIGS. 3A-3B), based on a first flag in the bitstream. At step 2406, the codec can enable or disable a second coding mode for the video sequence, based on a second flag in the bitstream. The first and second coding modes can be two different coding modes, which can be selected from a bi-directional optical flow (BDOF) mode, a prediction refinement with optical flow (PROF) mode, and a decoder side motion vector refinement (DMVR) mode. For example, the first coding mode and the second coding mode can be a bi-directional optical flow (BDOF) mode and a prediction refinement with optical flow (PROF) mode, respectively.

In some embodiments, the codec can detect the first and second flags in a Sequence Parameter Set (SPS) of the video sequence. For example, the first and second flags can be selected from the flag sps_bdof_enabled_flag, the flag sps_dmvr_enabled_flag, and the flag sps_affine_prof_enabled_flag as described in FIG. 12, 14A-14B, 16, or 20. As another example, if the first coding mode and the second coding mode are the BDOF mode and the PROF mode, respectively, the first flag and the second flag can be the flag sps_bdof_enabled_flag and the flag sps_affine_prof_enabled_flag, respectively, as described in FIG. 12, 14A-14B, 16, or 20.

At step 2408, the codec can determine whether controlling of at least one of the first coding mode or the second coding mode is enabled at a level lower than a sequence level, based on a third flag in the bitstream. The level lower than the sequence level can include a slice level or a picture level. In some embodiments, the codec can detect the third flag in the SPS of the video sequence in response to at least one of the first coding mode or the second coding mode being enabled for the video sequence. For example, the third flag can be the flag sps_bdof_dmvr_slice_present_flag, the flag sps_bdof_slice_present_flag, the flag sps_dmvr_slice_present_flag, the flag sps_affine_prof_slice_present_flag, the flag sps_bdof_picture_present_flag, the flag sps_dmvr_picture_present_flag, the flag sps_affine_prof_picture_present_flag, the flag sps_bdof_affine_prof_slice_present_flag, or the flag sps_bdof_dmvr_affine_prof_slice_present_flag as described in FIG. 12, 14A-14B, 16, or 20.

In some embodiments, after step 2408, the codec can enable or disable the first coding mode (e.g., BDOF) for a target lower-level region based on a fourth flag (e.g., slice_disable_bdof_flag as described in FIG. 22) in the bitstream in response to the first flag (e.g., sps_bdof_enabled_flag as described in FIG. 20) indicating that the first coding mode is enabled for the video sequence and the third flag (e.g., sps_bdof_affine_prof_slice_present_flag as described in FIG. 20) indicating that the controlling of at least one of the first coding mode or the second coding mode (e.g., PROF) is enabled at the level lower than the sequence level. The target lower-level region can be a target slice or a target picture. If the target lower level is a target slice, in some embodiments, the codec can detect the fourth flag in a slice header of the target slice. If the target lower level is a target picture, in some embodiments, the codec can detect the fourth flag in a picture header of the target picture. For example, the fourth flag can be the flag slice_disable_bdof_dmvr_flag, the flag slice_disable_bdof_flag, the flag slice_disable_dmvr_flag, the flag slice_disable_affine_prof_flag, the flag ph_disable_bdof_flag, the flag ph_disable_dmvr_flag, the flag ph_disable_affine_prof_flag, the flag slice_disable_bdof_dmvr_affine_prof_flag, or the flag slice_disable_bdof_affine_prof_flag as described in FIG. 13, 15A-15B, 17-19, or 21-22.

In some embodiments, after step 2408, the codec can enable or disable both the first coding mode (e.g., BDOF) and the second coding mode (e.g., PROF) for a target lower-level region based on a fourth flag (e.g., slice_disable_bdof_affine_prof_flag as described in FIG. 21) in the bitstream in response to the controlling of at least one of the first coding mode or the second coding mode being enabled at the level lower than the sequence level. For example, the third flag (e.g., sps_bdof_affine_prof_slice_present_flag as described in FIG. 20) can indicate that at least one of the first coding mode or the second coding mode is enabled at a lower level (e.g. a slice level).

In some embodiments, after enabling or disabling both the first coding mode and the second coding mode for a target lower-level region (e.g., a target slice or a target picture) based on a fourth flag in the bitstream, the codec can further enable or disable a third coding mode for the video sequence based on a second flag in the bitstream and determine whether controlling of the third coding mode is enabled at the level lower than the sequence level based on a fifth flag in the bitstream. For example, the first, second, and third coding modes can be a BDOF mode, a PROF mode, and a DMVR mode, respectively. In this example, the fourth flag can be the flag slice_disable_bdof_affine_prof_flag as described in FIG. 21, the second flag can be the flag sps_dmvr_enabled_flag as described in FIG. 20, and the fifth flag can be the flag sps_dmvr_slice_present_flag as described in FIG. 20.

In some embodiments, in response to the third coding mode being enabled at the lower level (e.g., the slice level or the picture level), the codec can further enable or disable the third coding mode for the target lower-level region (e.g., the target slice or the target picture) based on a sixth flag in the bitstream. For example, when the first, second, and third coding modes can be a BDOF mode, a PROF mode, and a DMVR mode, respectively, the sixth flag can be slice_disable_dmvr_flag as described in FIG. 21.

Figure 25:
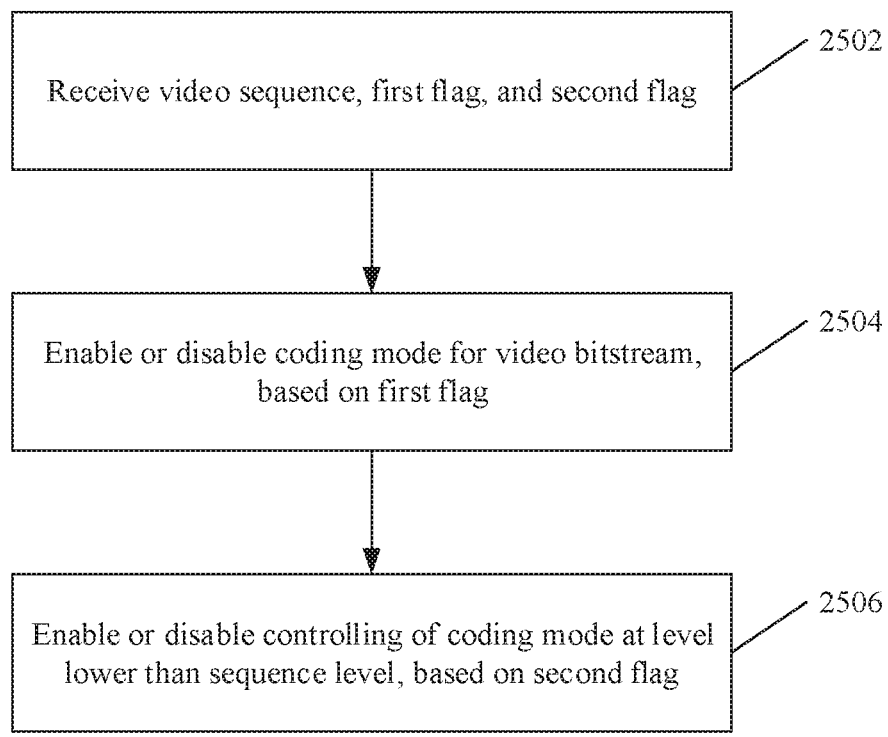
FIG. 25 illustrates a flowchart of an example process of controlling a video encoding mode, according to some embodiments of this disclosure.

FIG. 25 illustrates a flowchart of an example process 2500 of controlling a video encoding mode, according to some embodiments of this disclosure. At step 2502, a codec (e.g., an encoder in FIGS. 2A-2B) can receive a video sequence (e.g., video sequence 202 in process 200A or 200B in FIGS. 2A-2B), a first flag, and a second flag. For example, the first flag can be the flag sps_bdof_enabled_flag, the flag sps_dmvr_enabled_flag, or the flag sps_affine_prof_enabled_flag as described in FIG. 12, 14A-14B, 16, or 20. As another example, the second flag can be the flag sps_bdof_dmvr_slice_present_flag, the flag sps_bdof_slice_present_flag, the flag sps_dmvr_slice_present_flag, the flag sps_affine_prof_slice_present_flag, the flag sps_bdof_picture_present_flag, the flag sps_dmvr_picture_present_flag, the flag sps_affine_prof_picture_present_flag, the flag sps_bdof_affine_prof_slice_present_flag, or the flag sps_bdof_dmvr_affine_prof_slice_present_flag as described in FIG. 12, 14A-14B, 16, or 20.

At step 2504, the codec can enable or disable a coding mode for a video bitstream (e.g., video bitstream 228 in process 200A or 200B in FIGS. 2A-2B), based on a first flag in the bitstream. For example, the coding mode can be at least one of a bi-directional optical flow (BDOF) mode, a prediction refinement with optical flow (PROF) mode, or a decoder side motion vector refinement (DMVR) mode.

At step 2506, the codec can enable or disable controlling of the coding mode at a level lower than a sequence level, based on the second flag. The level lower than the sequence level can include a slice level or a picture level.

Figure 26:
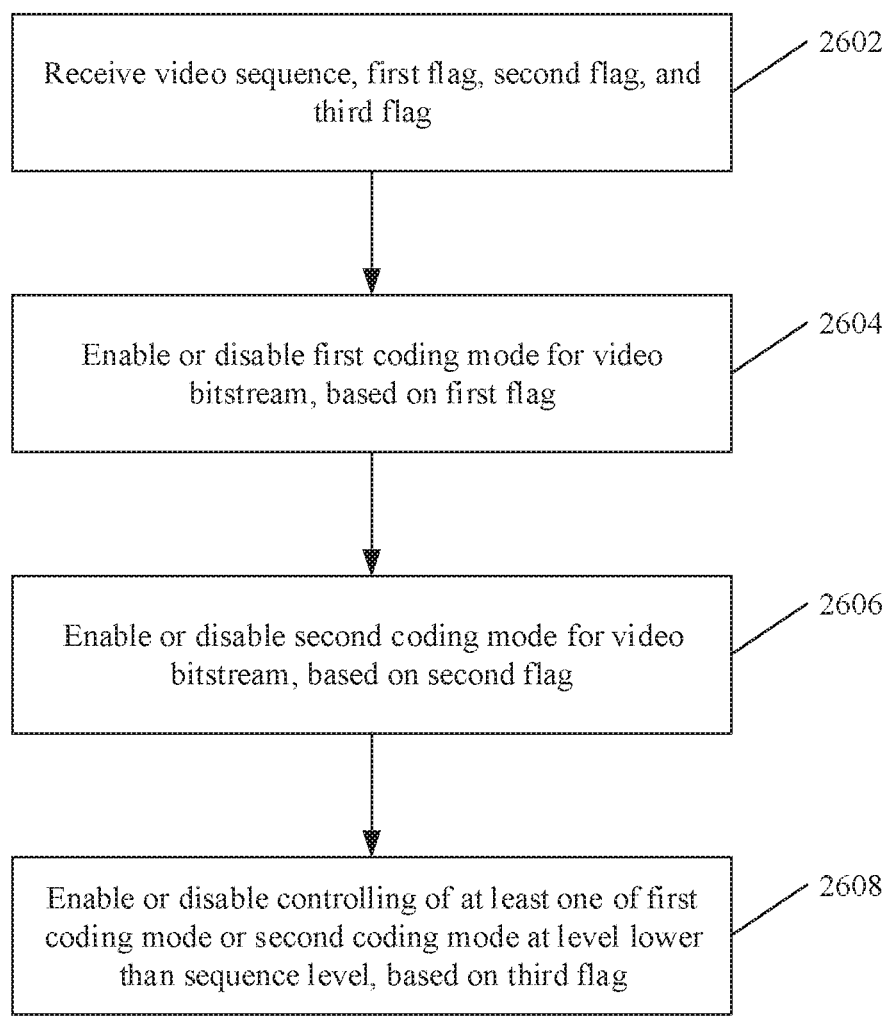
FIG. 26 illustrates a flowchart of another example process of controlling a video encoding mode, according to some embodiments of this disclosure.

FIG. 26 illustrates a flowchart of another example process 2600 of controlling a video encoding mode, according to some embodiments of this disclosure. At step 2602, a codec (e.g., an encoder in FIGS. 2A-2B) can receive a video sequence (e.g., video sequence 202 in process 200A or 200B in FIGS. 2A-2B), a first flag, a second flag, and a third flag. For example, the first and second flags can be selected from the flag sps_bdof_enabled_flag, the flag sps_dmvr_enabled_flag, and the flag sps_affine_prof_enabled_flag as described in FIG. 12, 14A-14B, 16, or 20. As another example, the third flag can be the flag sps_bdof_dmvr_slice_present_flag, the flag sps_bdof_slice_present_flag, the flag sps_dmvr_slice_present_flag, the flag sps_affine_prof_slice_present_flag, the flag sps_bdof_picture_present_flag, the flag sps_dmvr_picture_present_flag, the flag sps_affine_prof_picture_present_flag, the flag sps_bdof_affine_prof_slice_present_flag, or the flag sps_bdof_dmvr_affine_prof_slice_present_flag as described in FIG. 12, 14A-14B, 16, or 20.

At step 2604, the codec can enable or disable a first coding mode for a video bitstream (e.g., video bitstream 228 in process 200A or 200B in FIGS. 2A-2B), based on the first flag. At step 2606, the codec can enable or disable a second coding mode for the video bitstream, based on the second flag. The first and second coding modes can be two different coding modes, which can be selected from a bi-directional optical flow (BDOF) mode, a prediction refinement with optical flow (PROF) mode, and a decoder side motion vector refinement (DMVR) mode. For example, the first coding mode and the second coding mode can be a bi-directional optical flow (BDOF) mode and a prediction refinement with optical flow (PROF) mode, respectively.

At step 2608, the codec can enable or disable controlling of at least one of the first coding mode or the second coding mode at a level lower than a sequence level, based on the third flag. The level lower than the sequence level can include a slice level or a picture level.

In some embodiments, a non-transitory computer-readable storage medium including instructions is also provided, and the instructions can be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

The embodiments can further be described using the following clauses:

1. A computer-implemented method, comprising:
   receiving a bitstream of video data;
   enabling or disabling a coding mode for a video sequence, based on a first flag in the bitstream; and
   determining whether controlling of the coding mode is enabled or disabled at a level lower than a sequence level, based on a second flag in the bitstream.

2. The computer-implemented method according to clause 1, wherein the level lower than the sequence level comprises a slice level or a picture level.

3. The computer-implemented method according to any of clauses 1-2, further comprising:
   in response to the controlling of the coding mode being enabled at the level lower than the sequence level, enabling or disabling the coding mode for a target lower-level region, based on a third flag in the bitstream.

4. The computer-implemented method according to clause 3, further comprising:
   detecting the third flag in a slice header of a target slice, wherein the target slice is the target lower-level region; or detecting the third flag in a picture header of a target picture, wherein the target picture is the target lower-level region.

5. The computer-implemented method according to any one of clauses 1-4, wherein the coding mode is at least one of:
a bi-directional optical flow (BDOF) mode,
a prediction refinement with optical flow (PROF) mode; or
a decoder side motion vector refinement (DMVR) mode.

6. The computer-implemented method according to any one of clauses 1-5, further comprising:
detecting the first flag in a Sequence Parameter Set (SPS) of the video sequence.

7. The computer-implemented method according to any one of clauses 1-6, further comprising:
in response to the coding mode being enabled for the video sequence, detecting the second flag in the SPS of the video sequence.

8. A computer-implemented method, comprising:
receiving a bitstream of video data;
enabling or disabling a first coding mode for a video sequence, based on a first flag in the bitstream;
enabling or disabling a second coding mode for the video sequence, based on a second flag in the bitstream; and
determining whether controlling of at least one of the first coding mode or the second coding mode is enabled at a level lower than a sequence level, based on a third flag in the bitstream.

9. The computer-implemented method according to clause 8, wherein the level lower than the sequence level comprises a slice level or a picture level.

10. The computer-implemented method according to any of clauses 8-9, further comprising:
in response to the controlling of at least one of the first coding mode or the second coding mode being enabled at the level lower than the sequence level, enabling or disabling both the first coding mode and the second coding mode for a target lower-level region, based on a fourth flag in the bitstream.

11. The computer-implemented method according to clause 10, further comprising:
detecting the fourth flag in a slice header of a target slice, wherein the target slice is the target lower-level region; or
detecting the fourth flag in a picture header of a target picture, wherein the target picture is the target lower-level region.

12. The computer-implemented method according to any one of clauses 10-11, further comprising:
enabling or disabling a third coding mode for the video sequence, based on the second flag in the bitstream; and
determining whether controlling of the third coding mode is enabled at the level lower than the sequence level, based on a fifth flag in the bitstream.

13. The computer-implemented method according to clause 12, further comprising:
in response to the third coding mode being enabled at the level lower than the sequence level, enabling or disabling the third coding mode for the target lower-level region, based on a sixth flag in the bitstream.

14. The computer-implemented method according to any one of clauses 12 and 13, wherein the first, second, and third coding modes are a bi-directional optical flow (BDOF) mode, a prediction refinement with optical flow (PROF) mode, and a decoder side motion vector refinement (DMVR) mode, respectively.

15. The computer-implemented method according to any one of clauses 8-14, further comprising:
in response to the first flag indicating that the first coding mode is enabled for the video sequence and the third flag indicating that the controlling of at least one of the first coding mode or the second coding mode is enabled at the level lower than the sequence level, enabling or disabling the first coding mode for a target lower-level region, based on a fourth flag in the bitstream.

16. The computer-implemented method according to any one of clauses 8-15, wherein the first and second coding modes are two different coding modes selected from:
a bi-directional optical flow (BDOF) mode;
a prediction refinement with optical flow (PROF) mode; and
a decoder side motion vector refinement (DMVR) mode.

17. The computer-implemented method according to any one of clauses 8-16, wherein the first coding mode and the second coding mode are a bi-directional optical flow (BDOF) mode and a prediction refinement with optical flow (PROF) mode, respectively.

18. The computer-implemented method according to any one of clauses 8-17, further comprising:
detecting the first and second flags in a Sequence Parameter Set (SPS) of the video sequence.

19. The computer-implemented method according to any one of clauses 8-18, further comprising:
in response to at least one of the first coding mode or the second coding mode being enabled for the video sequence, detecting the third flag in the SPS of the video sequence.

20. A computer-implemented method, comprising:
receiving a video sequence, a first flag, and a second flag;
enabling or disabling a coding mode for a video bitstream, based on the first flag; and
enabling or disabling controlling of the coding mode at a level lower than a sequence level, based on the second flag.

21. The computer-implemented method according to clause 20, wherein the level lower than the sequence level comprises a slice level or a picture level.

22. The computer-implemented method according to any of clauses 20-21, further comprising:
receiving a third flag; and
in response to the controlling of enabling or disabling the coding mode at the level lower than the sequence level, enabling or disabling the coding mode for a target lower-level region based on the third flag.

23. The computer-implemented method according to clause 22, further comprising:
storing the third flag in a slice header of a target slice, wherein the target slice is the target lower-level region; or
storing the third flag in a picture header of a target picture, wherein the target picture is the target lower-level region.

24. The computer-implemented method according to any one of clauses 20-23, wherein the coding mode is at least one of:
a bi-directional optical flow (BDOF) mode;
a prediction refinement with optical flow (PROF) mode; or
a decoder side motion vector refinement (DMVR) mode.

25. The computer-implemented method according to any one of clauses 20-24, further comprising:
storing the first flag in a Sequence Parameter Set (SPS) of the video bitstream.

26. The computer-implemented method according to any one of clauses 20-25, further comprising:
in response to enabling or disabling the coding mode for the video bitstream, storing the second flag in the SPS of the video bitstream.
27. A computer-implemented method, comprising:
receiving a video sequence, a first flag, a second flag, and a third flag;
enabling or disabling a first coding mode for a video bitstream, based on the first flag;
enabling or disabling a second coding mode for the video bitstream, based on the second flag: and
enabling or disabling controlling of at least one of the first coding mode or the second coding mode at a level lower than a sequence level, based on the third flag.
28. The computer-implemented method according to clause 27, wherein the level lower than the sequence level comprises a slice level or a picture level.
29. The computer-implemented method according to any of clauses 27-28, further comprising:
receiving a fourth flag; and
in response to enabling the controlling of the first coding mode for the video bitstream based on the first flag and enabling the controlling of the at least one of the first coding mode or the second coding mode at the level lower than the sequence level based on the third flag, enabling or disabling the first coding mode for a target lower-level region based on the fourth flag.
30. The computer-implemented method according to any of clauses 27-28, further comprising:
receiving a fourth flag; and
in response to enabling or disabling the controlling of the at least one of the first coding mode or the second coding mode at the level lower than the sequence level, enabling or disabling both the first coding mode and the second coding mode for a target lower-level region based on the fourth flag.
31. The computer-implemented method according to any one of clauses 29-30, further comprising:
storing the fourth flag in a slice header of a target slice, wherein the target slice is the target lower-level region; or
storing the fourth flag in a picture header of a target picture, wherein the target picture is the target lower-level region.
32. The computer-implemented method according to clause 31, further comprising:
receiving a fifth flag;
enabling or disabling a third coding mode for the video bitstream, based on the second flag; and
enabling or disabling controlling of the third coding mode at the level lower than the sequence level, based on the fifth flag.
33. The computer-implemented method according to any one of clauses 31 and 32, further comprising:
receiving a sixth flag; and
in response to enabling or disabling the controlling of the third coding mode at the level lower than the sequence level, enabling or disabling the third coding mode for the target lower-level region based on the sixth flag.
34. The computer-implemented method according to any one of clauses 27-33, wherein the first, second, and third coding modes are a bi-directional optical flow (BDOF) mode, a prediction refinement with optical flow (PROF) mode, and a decoder side motion vector refinement (DMVR) mode, respectively.

35. The computer-implemented method according to any one of clauses 27-33, wherein the first and second coding modes are two different coding modes selected from:
a bi-directional optical flow (BDOF) mode;
a prediction refinement with optical flow (PROF) mode; and
a decoder side motion vector refinement (DMVR) mode.
36. The computer-implemented method according to any one of clauses 27-35, wherein the first coding mode and the second coding mode are a bi-directional optical flow (BDOF) mode and a prediction refinement with optical flow (PROF) mode, respectively.
37. The computer-implemented method according to any one of clauses 27-36, further comprising:
storing the first and second flags in a Sequence Parameter Set (SPS) of the video bitstream.
38. The computer-implemented method according to any one of clauses 27-37, further comprising:
in response to enabling the at least one of the first coding mode or the second coding mode for the video bitstream, storing the third flag in the SPS of the video sequence.
39. A non-transitory computer-readable medium storing a set of instructions that is executable by at least one processor of an apparatus to cause the apparatus to perform a method, the method comprising:
receiving a bitstream of video data;
enabling or disabling a coding mode for a video sequence, based on a first flag in the bitstream; and
determining whether controlling of the coding mode is enabled or disabled at a level lower than a sequence level, based on a second flag in the bitstream.
40. The non-transitory computer-readable medium according to clause 39, wherein the level lower than the sequence level comprises a slice level or a picture level.
41. The non-transitory computer-readable medium according to any of clauses 39-40, wherein the set of instructions that is executable by the at least one processor of the apparatus causes the apparatus to further perform:
in response to the controlling of the coding mode being enabled at the level lower than the sequence level, enabling or disabling the coding mode for a target lower-level region, based on a third flag in the bitstream.
42. The non-transitory computer-readable medium according to clause 41, wherein the set of instructions that is executable by the at least one processor of the apparatus causes the apparatus to further perform:
detecting the third flag in a slice header of a target slice, wherein the target slice is the target lower-level region; or
detecting the third flag in a picture header of a target picture, wherein the target picture is the target lower-level region.
43. The non-transitory computer-readable medium according to any one of clauses 39-42, wherein the coding mode is at least one of:
a bi-directional optical flow (BDOF) mode;
a prediction refinement with optical flow (PROF) mode; or
a decoder side motion vector refinement (DMVR) mode.
44. The non-transitory computer-readable medium according to any one of clauses 39-43, wherein the set of instructions that is executable by the at least one processor of the apparatus causes the apparatus to further perform:

detecting the first flag in a Sequence Parameter Set (SPS) of the video sequence.

45. The non-transitory computer-readable medium according to any one of clauses 39-44, wherein the set of instructions that is executable by the at least one processor of the apparatus causes the apparatus to further perform:

in response to the coding mode being enabled for the video sequence, detecting the second flag in the SPS of the video sequence.

46. A non-transitory computer-readable medium storing a set of instructions that is executable by at least one processor of an apparatus to cause the apparatus to perform a method, the method comprising:

receiving a bitstream of video data;

enabling or disabling a first coding mode for a video sequence, based on a first flag in the bitstream;

enabling or disabling a second coding mode for the video sequence, based on a second flag in the bitstream; and determining whether controlling of at least one of the first coding mode or the second coding mode is enabled at a level lower than a sequence level, based on a third flag in the bitstream.

47. The non-transitory computer-readable medium according to clause 46, wherein the level lower than the sequence level comprises a slice level or a picture level.

48. The non-transitory computer-readable medium according to any of clauses 46-47, wherein the set of instructions that is executable by the at least one processor of the apparatus causes the apparatus to further perform:

in response to the controlling of at least one of the first coding mode or the second coding mode being enabled at the level lower than the sequence level, enabling or disabling both the first coding mode and the second coding mode for a target lower-level region, based on a fourth flag in the bitstream.

49. The non-transitory computer-readable medium according to clause 48, wherein the set of instructions that is executable by the at least one processor of the apparatus causes the apparatus to further perform:

detecting the fourth flag in a slice header of a target slice, wherein the target slice is the target lower-level region; or detecting the fourth flag in a picture header of a target picture, wherein the target picture is the target lower-level region.

50. The non-transitory computer-readable medium according to any one of clauses 48-49, wherein the set of instructions that is executable by the at least one processor of the apparatus causes the apparatus to further perform:

enabling or disabling a third coding mode for the video sequence, based on the second flag in the bitstream; and determining whether controlling of the third coding mode is enabled at the level lower than the sequence level, based on a fifth flag in the bitstream.

51. The non-transitory computer-readable medium according to clause 50, wherein the set of instructions that is executable by the at least one processor of the apparatus causes the apparatus to further perform:

in response to the third coding mode being enabled at the level lower than the sequence level, enabling or disabling the third coding mode for the target lower-level region, based on a sixth flag in the bitstream.

52. The non-transitory computer-readable medium according to any one of clauses 50 and 51, wherein the first, second, and third coding modes are a bi-directional optical flow (BDOF) mode, a prediction refinement with optical flow (PROF) mode, and a decoder side motion vector refinement (DMVR) mode, respectively.

53. The non-transitory computer-readable medium according to any one of clauses 46-52, wherein the set of instructions that is executable by the at least one processor of the apparatus causes the apparatus to further perform:

in response to the first flag indicating that the first coding mode is enabled for the video sequence and the third flag indicating that the controlling of at least one of the first coding mode or the second coding mode is enabled at the level lower than the sequence level, enabling or disabling the first coding mode for a target lower-level region, based on a fourth flag in the bitstream.

54. The non-transitory computer-readable medium according to any one of clauses 46-53, wherein the first and second coding modes are two different coding modes selected from:

a bi-directional optical flow (BDOF) mode;

a prediction refinement with optical flow (PROF) mode; and a decoder side motion vector refinement (DMVR) mode.

55. The non-transitory computer-readable medium according to any one of clauses 46-54, wherein the first coding mode and the second coding mode are a bi-directional optical flow (BDOF) mode and a prediction refinement with optical flow (PROF) mode, respectively.

56. The non-transitory computer-readable medium according to any one of clauses 46-55, wherein the set of instructions that is executable by the at least one processor of the apparatus causes the apparatus to further perform:

detecting the first and second flags in a Sequence Parameter Set (SPS) of the video sequence.

57. The non-transitory computer-readable medium according to any one of clauses 46-56, wherein the set of instructions that is executable by the at least one processor of the apparatus causes the apparatus to further perform:

in response to at least one of the first coding mode or the second coding mode being enabled for the video sequence, detecting the third flag in the SPS of the video sequence.

58. A non-transitory computer-readable medium storing a set of instructions that is executable by at least one processor of an apparatus to cause the apparatus to perform a method, the method comprising:

receiving a video sequence, a first flag, and a second flag;

enabling or disabling a coding mode for a video bitstream, based on the first flag; and enabling or disabling controlling of the coding mode at a level lower than a sequence level, based on the second flag.

59. The non-transitory computer-readable medium according to clause 58, wherein the level lower than the sequence level comprises a slice level or a picture level.

60. The non-transitory computer-readable medium according to any of clauses 58-59, wherein the set of instructions that is executable by the at least one processor of the apparatus causes the apparatus to further perform:
receiving third flag; and
in response to the controlling of enabling or disabling the coding mode at the level lower than the sequence level, enabling or disabling the coding mode for a target lower-level region based on the third flag.
61. The non-transitory computer-readable medium according to clause 60, wherein the set of instructions that is executable by the at least one processor of the apparatus causes the apparatus to further perform:
storing the third flag in a slice header of a target slice, wherein the target slice is the target lower-level region; or
storing the third flag in a picture header of a target picture, wherein the target picture is the target lower-level region.
62. The non-transitory computer-readable medium according to any one of clauses 58-61, wherein the coding mode is at least one of:
a bi-directional optical flow (BDOF) mode;
a prediction refinement with optical flow (PROF) mode; or
a decoder side motion vector refinement (DMVR) mode.
63. The non-transitory computer-readable medium according to any one of clauses 58-62, wherein the set of instructions that is executable by the at least one processor of the apparatus causes the apparatus to further perform:
storing the first flag in a Sequence Parameter Set (SPS) of the video bitstream.
64. The non-transitory computer-readable medium according to any one of clauses 58-63, wherein the set of instructions that is executable by the at least one processor of the apparatus causes the apparatus to further perform:
in response to enabling or disabling the coding mode for the video bitstream, storing the second flag in the SPS of the video bitstream.
65. A non-transitory computer-readable medium storing a set of instructions that is executable by at least one processor of an apparatus to cause the apparatus to perform a method, the method comprising:
receiving a video sequence, a first flag, a second flag, and a third flag;
enabling or disabling a first coding mode for a video bitstream, based on the first flag;
enabling or disabling a second coding mode for the video bitstream, based on the second flag; and
enabling or disabling controlling of at least one of the first coding mode or the second coding mode at a level lower than a sequence level, based on the third flag.
66. The non-transitory computer-readable medium according to clause 65, wherein the level lower than the sequence level comprises a slice level or a picture level.
67. The non-transitory computer-readable medium according to any of clauses 65-66, wherein the set of instructions that is executable by the at least one processor of the apparatus causes the apparatus to further perform:
receiving a fourth flag; and
in response to enabling the controlling of the first coding mode for the video bitstream based on the first flag and enabling the controlling of the at least one of the first coding mode or the second coding mode at the level lower than the sequence level based on the third flag, enabling or disabling the first coding mode for a target lower-level region based on the fourth flag.
68. The non-transitory computer-readable medium according to any of clauses 65-66, wherein the set of instructions that is executable by the at least one processor of the apparatus causes the apparatus to further perform:
receiving a fourth flag; and
in response to enabling or disabling the controlling of the at least one of the first coding mode or the second coding mode at the level lower than the sequence level, enabling or disabling both the first coding mode and the second coding mode for a target lower-level region based on the fourth flag.
69. The non-transitory computer-readable medium according to any one of clauses 67-68, wherein the set of instructions that is executable by the at least one processor of the apparatus causes the apparatus to further perform:
storing the fourth flag in a slice header of a target slice, wherein the target slice is the target lower-level region; or
storing the fourth flag in a picture header of a target picture, wherein the target picture is the target lower-level region.
70. The non-transitory computer-readable medium according to clause 69, wherein the set of instructions that is executable by the at least one processor of the apparatus causes the apparatus to further perform:
receiving a fifth flag;
enabling or disabling a third coding mode for the video bitstream, based on the second flag; and
enabling or disabling controlling of the third coding mode at the level lower than the sequence level, based on the fifth flag.
71. The non-transitory computer-readable medium according to any one of clauses 69 and 70, wherein the set of instructions that is executable by the at least one processor of the apparatus causes the apparatus to further perform:
receiving a sixth flag; and
in response to enabling or disabling the controlling of the third coding mode at the level lower than the sequence level, enabling or disabling the third coding mode for the target lower-level region based on the sixth flag.
72. The non-transitory computer-readable medium according to any one of clauses 65-71, wherein the first, second, and third coding modes are a bi-directional optical flow (BDOF) mode, a prediction refinement with optical flow (PROF) mode, and a decoder side motion vector refinement (DMVR) mode, respectively.
73. The non-transitory computer-readable medium according to any one of clauses 65-72, wherein the first and second coding modes are two different coding modes selected from:
a bi-directional optical flow (BDOF) mode;
a prediction refinement with optical flow (PROF) mode; and
a decoder side motion vector refinement (DMVR) mode.
74. The non-transitory computer-readable medium according to any one of clauses 65-73, wherein the first coding mode and the second coding mode are a bi-directional optical flow (BDOF) mode and a prediction refinement with optical flow (PROF) mode, respectively.
75. The non-transitory computer-readable medium according to any one of clauses 65-74, wherein the set of instructions that is executable by the at least one processor of the apparatus causes the apparatus to further perform:

storing the first and second flags in a Sequence Parameter Set (SPS) of the video bitstream.

76. The non-transitory computer-readable medium according to any one of clauses 65-75, wherein the set of instructions that is executable by the at least one processor of the apparatus causes the apparatus to further perform:

in response to enabling the at least one of the first coding mode or the second coding mode for the video bitstream, storing the third flag in the SPS of the video sequence.

77. An apparatus, comprising:

a memory configured to store a set of instructions; and one or more processors communicatively coupled to the memory and configured to execute the set of instructions to cause the apparatus to:

receive a bitstream of video data;

enable or disable a coding mode for a video sequence, based on a first flag in the bitstream; and determine whether controlling of the coding mode is enabled or disabled at a level lower than a sequence level, based on a second flag in the bitstream.

78. The apparatus according to clause 77, wherein the level lower than the sequence level comprises a slice level or a picture level.

79. The apparatus according to any of clauses 77-78, wherein the one or more processors are further configured to execute the set of instructions to cause the apparatus to:

in response to the controlling of the coding mode being enabled at the level lower than the sequence level, enable or disable the coding mode for a target lower-level region, based on a third flag in the bitstream.

80. The apparatus according to clause 79, wherein the one or more processors are further configured to execute the set of instructions to cause the apparatus to:

detect the third flag in a slice header of a target slice, wherein the target slice is the target lower-level region; or detect the third flag in a picture header of a target picture, wherein the target picture is the target lower-level region.

81. The apparatus according to any one of clauses 77-80, wherein the coding mode is at least one of:

a bi-directional optical flow (BDOF) mode;

a prediction refinement with optical flow (PROF) mode; or a decoder side motion vector refinement (DMVR) mode.

82. The apparatus according to any one of clauses 77-81, wherein the one or more processors are further configured to execute the set of instructions to cause the apparatus to:

detect the first flag in a Sequence Parameter Set (SPS) of the video sequence.

83. The apparatus according to any one of clauses 77-82, wherein the one or more processors are further configured to execute the set of instructions to cause the apparatus to:

in response to the coding mode being enabled for the video sequence, detect the second flag in the SPS of the video sequence.

84. An apparatus, comprising:

a memory configured to store a set of instructions; and one or more processors communicatively coupled to the memory and configured to execute the set of instructions to cause the apparatus to:

receive a bitstream of video data;

enable or disable a first coding mode for a video sequence, based on a first flag in the bitstream;

enable or disable a second coding mode for the video sequence, based on a second flag in the bitstream; and determine whether controlling of at least one of the first coding mode or the second coding mode is enabled at a level lower than a sequence level, based on a third flag in the bitstream.

85. The apparatus according to clause 84, wherein the level lower than the sequence level comprises a slice level or a picture level.

86. The apparatus according to any of clauses 84-85, wherein the one or more processors are further configured to execute the set of instructions to cause the apparatus to:

in response to the controlling of at least one of the first coding mode or the second coding mode being enabled at the level lower than the sequence level, enable or disable both the first coding mode and the second coding mode for a target lower-level region, based on a fourth flag in the bitstream.

87. The apparatus according to clause 86, wherein the one or more processors are further configured to execute the set of instructions to cause the apparatus to:

detect the fourth flag in a slice header of a target slice, wherein the target slice is the target lower-level region; or detect the fourth flag in a picture header of a target picture, wherein the target picture is the target lower-level region.

88. The apparatus according to any one of clauses 86-87, wherein the one or more processors are further configured to execute the set of instructions to cause the apparatus to:

enable or disable a third coding mode for the video sequence, based on the second flag in the bitstream; and determine whether controlling of the third coding mode is enabled at the level lower than the sequence level, based on a fifth flag in the bitstream.

89. The apparatus according to clause 88, wherein the one or more processors are further configured to execute the set of instructions to cause the apparatus to:

in response to the third coding mode being enabled at the level lower than the sequence level, enable or disable the third coding mode for the target lower-level region, based on a sixth flag in the bitstream.

90. The apparatus according to any one of clauses 88 and 89, wherein the first, second, and third coding modes are a bi-directional optical flow (BDOF) mode, a prediction refinement with optical flow (PROF) mode, and a decoder side motion vector refinement (DMVR) mode, respectively.

91. The apparatus according to any one of clauses 84-90, wherein the one or more processors are further configured to execute the set of instructions to cause the apparatus to:

in response to the first flag indicating that the first coding mode is enabled for the video sequence and the third flag indicating that the controlling of at least one of the first coding mode or the second coding mode is enabled at the level lower than the sequence level, enable or disable the first coding mode for a target lower-level region, based on a fourth flag in the bitstream.

92. The apparatus according to any one of clauses 84-91, wherein the first and second coding modes are two different coding modes selected from:
a bi-directional optical flow (BDOF) mode;
a prediction refinement with optical flow (PROF) mode; and
a decoder side motion vector refinement (DMVR) mode.

93. The apparatus according to any one of clauses 84-92, wherein the first coding mode and the second coding mode are a bi-directional optical flow (BDOF) mode and a prediction refinement with optical flow (PROF) mode, respectively.

94. The apparatus according to any one of clauses 84-93, wherein the one or more processors are further configured to execute the set of instructions to cause the apparatus to:
detect the first and second flags in a Sequence Parameter Set (SPS) of the video sequence.

95. The apparatus according to any one of clauses 84-94, wherein the one or more processors are further configured to execute the set of instructions to cause the apparatus to:
in response to at least one of the first coding mode or the second coding mode being enabled for the video sequence, detect the third flag in the SPS of the video sequence.

96. An apparatus, comprising:
a memory configured to store a set of instructions; and
one or more processors communicatively coupled to the memory and configured to execute the set of instructions to cause the apparatus to:
 receive a video sequence, a first flag, and a second flag;
 enable or disable a coding mode for a video bitstream, based on the first flag; and
 enable or disable controlling of the coding mode at a level lower than a sequence level, based on the second flag.

97. The apparatus according to clause 96, wherein the level lower than the sequence level comprises a slice level or a picture level.

98. The apparatus according to any of clauses 96-97, wherein the one or more processors are further configured to execute the set of instructions to cause the apparatus to:
receive third flag; and
in response to the controlling of enabling or disabling the coding mode at the level lower than the sequence level, enable or disable the coding mode for a target lower-level region based on the third flag.

99. The apparatus according to clause 98, wherein the one or more processors are further configured to execute the set of instructions to cause the apparatus to:
store the third flag in a slice header of a target slice, wherein the target slice is the target lower-level region; or
store the third flag in a picture header of a target picture, wherein the target picture is the target lower-level region.

100. The apparatus according to any one of clauses 96-99, wherein the coding mode is at least one of:
a bi-directional optical flow (BDOF) mode;
a prediction refinement with optical flow (PROF) mode; or
a decoder side motion vector refinement (DMVR) mode.

101. The apparatus according to any one of clauses 96-100, wherein the one or more processors are further configured to execute the set of instructions to cause the apparatus to:
store the first flag in a Sequence Parameter Set (SPS) of the video bitstream.

102. The apparatus according to any one of clauses 96-101, wherein the one or more processors are further configured to execute the set of instructions to cause the apparatus to:
in response to enabling or disabling the coding mode for the video bitstream, store the second flag in the SPS of the video bitstream.

103. An apparatus, comprising:
a memory configured to store a set of instructions; and
one or more processors communicatively coupled to the memory and configured to execute the set of instructions to cause the apparatus to:
 receive a video sequence, a first flag, a second flag, and a third flag;
 enable or disable a first coding mode for a video bitstream, based on the first flag;
 enable or disable a second coding mode for the video bitstream, based on the second flag; and
 enable or disable controlling of at least one of the first coding mode or the second coding mode at a level lower than a sequence level, based on the third flag.

104. The apparatus according to clause 102, wherein the level lower than the sequence level comprises a slice level or a picture level.

105. The apparatus according to any of clauses 103-104, wherein the one or more processors are further configured to execute the set of instructions to cause the apparatus to:
receive a fourth flag; and
in response to enabling the controlling of the first coding mode for the video bitstream based on the first flag and enabling the controlling of the at least one of the first coding mode or the second coding mode at the level lower than the sequence level based on the third flag, enable or disable the first coding mode for a target lower-level region based on the fourth flag.

106. The apparatus according to any of clauses 103-104, wherein the one or more processors are further configured to execute the set of instructions to cause the apparatus to:
receive a fourth flag; and
in response to enabling or disabling the controlling of the at least one of the first coding mode or the second coding mode at the level lower than the sequence level, enable or disable both the first coding mode and the second coding mode for a target lower-level region based on the fourth flag.

107. The apparatus according to any one of clauses 105-106, wherein the one or more processors are further configured to execute the set of instructions to cause the apparatus to:
store the fourth flag in a slice header of a target slice, wherein the target slice is the target lower-level region; or
store the fourth flag in a picture header of a target picture, wherein the target picture is the target lower-level region.

108. The apparatus according to clause 107, wherein the one or more processors are further configured to execute the set of instructions to cause the apparatus to:
receive a fifth flag;

enable or disable a third coding mode for the video bitstream, based on the second flag; and enable or disable controlling of the third coding mode at the level lower than the sequence level, based on the fifth flag.

109. The apparatus according to any one of clauses 107 and 108, wherein the one or more processors are further configured to execute the set of instructions to cause the apparatus to:

receive a sixth flag; and in response to enabling or disabling the controlling of the third coding mode at the level lower than the sequence level, enable or disable the third coding mode for the target lower-level region based on the sixth flag 110. The apparatus according to any one of clauses 103-109, wherein the first, second, and third coding modes are a bi-directional optical flow (BDOF) mode, a prediction refinement with optical flow (PROF) mode, and a decoder side motion vector refinement (DMVR) mode, respectively.

111. The apparatus according to any one of clauses 103-110, wherein the first and second coding modes are two different coding modes selected from:

a bi-directional optical flow (BDOF) mode;

a prediction refinement with optical flow (PROF) mode; and a decoder side motion vector refinement (DMVR) mode.

112. The apparatus according to any one of clauses 103-110, wherein the first coding mode and the second coding mode are a bi-directional optical flow (BDOF) mode and a prediction refinement with optical flow (PROF) mode, respectively.

113. The apparatus according to any one of clauses 103-112, wherein the one or more processors are further configured to execute the set of instructions to cause the apparatus to:

store the first and second flags in a Sequence Parameter Set (SPS) of the video bitstream.

114. The apparatus according to any one of clauses 103-113, wherein the one or more processors are further configured to execute the set of instructions to cause the apparatus to:

in response to enabling the at least one of the first coding mode or the second coding mode for the video bitstream, store the third flag in the SPS of the video sequence.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module/unit, and each of the above described modules/units can be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed example embodiments. However, many variations and modifications can be made to these embodiments. Accordingly, although specific terms are employed, they are used in a generic and descriptive sense only and not for purposes of limitation.

What is claimed is:

1. A computer-implemented decoding method, comprising:

receiving a bitstream associated with a video sequence;

decoding a first plurality of flags in a sequence parameter set (SPS) of the bitstream; and determining whether a second plurality of flags is present in the bitstream, based on values of the first plurality of flags respectively, wherein:

the second plurality of flags respectively indicates whether a plurality of coding modes is enabled or disabled at a first syntax level lower than a sequence level;

the plurality of coding modes comprises a prediction refinement with optical flow (PROF) mode, a bi-directional optical flow (BDOF) mode, and a decoder side motion vector refinement (DMVR) mode; and when one or more of the second plurality of flags are present in the bitstream, the bitstream is decoded based on values of the one or more of the second plurality of flags.

2. The computer-implemented decoding method according to claim 1, wherein the second plurality of flags comprises:

a first flag associated with the PROF mode, a second flag associated with the BDOF mode, and a third flag associated with the DMVR mode, wherein the method further comprises:

when the first flag is present in the bitstream, enabling or disabling, based on a value of the first flag, the PROF mode at the first syntax level, when the second flag is present in the bitstream, enabling or disabling, based on a value of the second flag, the BDOF mode at the first syntax level, and when the third flag is present in the bitstream, enabling or disabling, based on a value of the third flag, the DMVR mode at the first syntax level.

3. The computer-implemented decoding method according to claim 1, further comprising:

decoding a third plurality of flags in the SPS; and enabling or disabling, based on values of the third plurality of flags, the plurality of coding modes respectively at the first syntax level.

4. The computer-implemented decoding method according to claim 1, wherein the first syntax level is a slice level or a picture level.

5. The computer-implemented decoding method according to claim 1, wherein the first plurality of flags comprises a first flag, the second plurality of flags comprises a second flag associated with the first flag, and the method further comprises:

in response to the first flag having a first value, determining that the second flag is present in a slice header or a picture header of the bitstream.

6. The computer-implemented decoding method according to claim 5, wherein the first value is 1.

7. A decoding apparatus, comprising:

a memory configured to store a set of instructions; and one or more processors configured to execute the set of instructions to cause the apparatus to perform:

receiving a bitstream associated with a video sequence;

decoding a first plurality of flags in a sequence parameter set (SPS) of the bitstream;

determining whether a second plurality of flags is present in the bitstream, based on values of the first plurality of flags respectively, wherein:

the second plurality of flags respectively indicates whether a plurality of coding modes is enabled or disabled at a first syntax level lower than a sequence level, and the plurality of coding modes comprises a prediction refinement with optical flow (PROF) mode, a bi-directional optical flow (BDOF) mode, and a decoder side motion vector refinement (DMVR) mode; and when one or more of the second plurality of flags are present in the bitstream, decoding the bitstream based on values of the one or more of the second plurality of flags.

8. The decoding apparatus according to claim 7, wherein the second plurality of flags comprises:

a first flag associated with the PROF mode, a second flag associated with the BDOF mode, and a third flag associated with the DMVR mode, wherein the one or more processors are further configured to execute the set of instructions to cause the apparatus to perform:

when the first flag is present in the bitstream, enabling or disabling, based on a value of the first flag, the PROF mode at the first syntax level, when the second flag is present in the bitstream, enabling or disabling, based on a value of the second flag, the BDOF mode at the first syntax level, and when the third flag is present in the bitstream, enabling or disabling, based on a value of the third flag, the DMVR mode at the first syntax level.

9. The decoding apparatus according to claim 7, wherein the one or more processors are further configured to execute the set of instructions to cause the apparatus to perform:

decoding a third plurality of flags in the SPS; and enabling or disabling, based on values of the third plurality of flags, the plurality of coding modes respectively at the first syntax level.

10. The decoding apparatus according to claim 7, wherein the first syntax level is a slice level or a picture level.

11. The decoding apparatus according to claim 7, wherein the first plurality of flags comprises a first flag, the second plurality of flags comprises a second flag associated with the first flag, and the one or more processors are further configured to execute the set of instructions to cause the apparatus to perform:

in response to the first flag having a first value, determining that the second flag is present in a slice header or a picture header of the bitstream.

12. The decoding apparatus according to claim 11, wherein the first value is 1.

13. A non-transitory computer readable storage medium storing a bitstream associated with a video sequence, the bitstream comprising:

a sequence parameter set (SPS) comprising a first plurality of flags, wherein:

the first plurality of flags respectively indicates whether a second plurality of flags is present in the bitstream;

the second plurality of flags respectively indicates whether a plurality of coding modes is enabled or disabled at a first syntax level lower than a sequence level; and the plurality of coding modes comprises a prediction refinement with optical flow (PROF) mode, a bi-directional optical flow (BDOF) mode, and a decoder side motion vector refinement (DMVR) mode.

14. The non-transitory computer readable storage medium according to claim 13, wherein the SPS of the bitstream further comprises:

a third plurality of flags respectively indicating whether the plurality of coding modes is enabled or disabled for the video sequence.

15. The non-transitory computer readable storage medium according to claim 13, wherein the first syntax level is a slice level or a picture level.

16. The non-transitory computer readable storage medium according to claim 13, wherein the bitstream further comprises:

a picture header, wherein the at least one of the second plurality of flags is comprised in the picture header.

17. The non-transitory computer readable storage medium according to claim 13, wherein the bitstream further comprises:

a slice header, wherein the at least one of the second plurality of flags is comprised in the slice header.

18. A computer-implemented encoding method, comprising:

encoding a first plurality of flags in a sequence parameter set (SPS) of a bitstream associated with a video sequence; and determining whether to signal a second plurality of flags in the bitstream, based on the first plurality of flags respectively, wherein:

the second plurality of flags respectively indicates whether a plurality of coding modes is enabled or disabled at a first syntax level lower than a sequence level;

the plurality of coding modes comprises a prediction refinement with optical flow (PROF) mode, a bi-directional optical flow (BDOF) mode, and a decoder side motion vector refinement (DMVR) mode; and when it is determined to signal one or more of the second plurality of flags are present in the bitstream, the bitstream is encoded based on values of the one or more of the second plurality of flags.

19. The computer-implemented encoding method according to claim 18, wherein the second plurality of flags comprises:

a first flag associated with the PROF mode, a second flag associated with the BDOF mode, and a third flag associated with the DMVR mode, wherein the method further comprises:

when it is determined to signal the first flag, enabling or disabling the PROF mode at the first syntax level, when it is determined to signal the second flag, enabling or disabling the BDOF mode at the first syntax level, and when it is determined to signal the third flag, enabling or disabling the DMVR mode at the first syntax level.

20. The computer-implemented encoding method according to claim 18, further comprising:

encoding a third plurality of flags in the SPS, wherein the third plurality of flags respectively indicates whether the plurality of coding modes is enabled or disabled for the video sequence.

21. The computer-implemented encoding method according to claim 18, wherein the first syntax level is a slice level or a picture level.

22. The computer-implemented encoding method according to claim 18, wherein the first plurality of flags comprises a first flag, the second plurality of flags comprises a second flag associated with the first flag, and the method further comprises:

in response to the first flag having a first value, encoding the second flag in a slice header or a picture header of the bitstream.

23. The computer-implemented encoding method according to claim 22, wherein the first value is 1.

* * * * *